United States Patent [19]

Blahut et al.

[11] 3,781,478

[45] Dec. 25, 1973

[54] MULTIPLEX COMMUNICATION SYSTEM

[75] Inventors: Donald Edgar Blahut, Bloomfield; Fritz Edgar Froehlich, New Shrewsbury, both of N.J.

[73] Assignee: Bell Telephone Laboratories, Incorporated, Murray Hill, N.J.

[22] Filed: July 7, 1972

[21] Appl. No.: 269,824

[52] U.S. Cl. .......... 179/15 AL
[51] Int. Cl. .......... H04j 3/08
[58] Field of Search .......... 179/15 AL

[56] References Cited

UNITED STATES PATENTS 3,586,782 6/1971 Thomas .......... 179/15 AL

FOREIGN PATENTS OR APPLICATIONS 1,108,462 4/1968 Great Britain .......... 179/15 AL

*Primary Examiner*—Ralph D. Blakeslee
*Attorney*—W. L. Keefauver et al.

[57] ABSTRACT

A time division multiplex communication system is described which includes a master timing station and a plurality of station sets serially interconnected forming a closed unidirectional transmission loop. Data and supervisory signals originating at a station set, together with digitally encoded speech, are time division multiplexed onto the loop, the information being inserted *m* bits at a time in a particular TDM channel associated with the called set. Each station set is arranged to store and repeat *m* bits at a time, the received digital bit stream, which may comprise data or supervisory signals while at the same time monitoring its assigned channel for the presence of information being transmitted thereto. A called set is arranged to extract and decode information contained in its channel, also *m* bits at a time. Since, for *n* station sets, the $n \times m$ bits on the loop at any given time can be stored within the stations, the number *n* of stations can be changed without alteration of any other equipment on the loop. Supervisory logic within each station set controls various set functions, including busy tone generation, ringer control, ringback indication, and so forth. One or more station sets may be modified to provide an interface with outside lines.

20 Claims, 20 Drawing Figures

MULTIPLEX COMMUNICATION SYSTEM

BACKGROUND OF THE INVENTION

1. Field of the Invention

This invention relates generally to time division multiplex communication systems, and, more particularly, to such systems wherein a plurality of station sets are serially interconnected forming a closed loop and arranged to unidirectionally transmit a stream of coded pulses therebetween.

2. Description of the Prior Art

Recent advances in integrated circuit technology have enabled the introduction of new and improved communication system designs and techniques that have heretofore been considered too complicated and thus too costly for practical implementation. Among these new systems are those that digitize or encode signals at their source, insert the encoded version, using time division multiplex procedures on to a unidirectional transmission line containing a plurality of station sets, and extract the original information by an appropriate decoding process at the station being called. The advantages of such systems, which are useful in transmitting not only telephone, telegraph and television signals, but also any generalized data or information, lie in the fact that centralized switching equipment, and the attendant lines interconnecting each station set with that equipment, may be replaced by distributing the supervisory and switching functions conventionally associated with the centralized equipment among the individual station sets to obtain a "time division switching" capability, and by simply connecting the sets, one to the other, in the form of a closed loop.

Several systems have already been proposed which utilize the principles of speech digitization at its source, coupled with time division switching. In one such system, a plurality of station sets are connected to a closed loop transmission line via active switches in each set. Information circulates unidirectionally on the loop, and is inserted into or extracted from an assigned TDM channel by appropriately actuating the switches during a particular time interval of each frame period. While this system possesses advantages over conventional counterparts, it unfortunately also has several drawbacks. First, the use of active switches in connecting the station sets in parallel across the line unduly complicates the system, and gives rise to the possibility that electrical reflections from the stations may interfere with and thereby distort the circulating bit stream. Second, the loop length is limited by the overall propagation delay that the system can tolerate, whereas a system in which the stations act as repeaters, and are connected in series on the loop, can accommodate a total length which is many times greater. Additionally, the system requires a variable delay circuit to compensate for loop propagation time, which also adds to system complexity.

In another proposed system, some of the aforementioned problems have been overcome. However, others still remain to be solved. For example, the terminal units are arranged to operate with a succession of multi-bit words, while each unit is, at any given time, capable of storing only one bit of information. Accordingly, a suitable memory or storage capacity must be provided on the loop, to store the remaining bits per word, thereby increasing system complexity. Since the required storage capacity is dependent upon the number of terminal units employed, the capacity must be changed as the size of the system is altered. Additionally, the organization of the word content is such as to require the dedication of several bit locations per channel for supervisory signals, (e.g., station busy signal) thereby limiting the number of bits left available for other data.

As a result of the foregoing, it is the broad object of the instant invention to provide an improved time division multiplex communication system of the type wherein a plurality of station sets are serially interconnected on a closed loop.

It is a further object of the invention to facilitate, in a system of the general type indicated, changes in the system size without the need for changes in the shared equipment or the station sets already on the loop.

Additional objects of the present invention are to make efficient use of the available time slots, to avoid signal distortion caused by electrical reflections from active line switches, and to ensure effective operaion over long total loop lengths.

SUMMARY OF THE INVENTION

Each of the foregoing and additional objects are achieved in accordance with the principles of the invention by a time division multiplex communication system which includes a plurality of uniquely arranged terminals serially interconnected to form a closed, unidirectional transmission loop. The terminals consist of "$n-1$" station sets, some of which may be adapted for interfacing with outside lines, and a master set, the latter of which includes a timing generator arranged to transmit a framing indication of width $t$ in response to the reception of the preceding framing indication. Each station set is adapted to store for a period $t$, and then regenerate, the framing indication, so that the time interval between the beginning of successive framing indications consists of $n$ time intervals of length $t$. These $n$ intervals, or channels, are uniquely associated with particular station sets, for receiving purposes. Data originating at a station set is, if in analog form, first converted to an appropriate digital format, and then inserted, $m$ bits at a time, into the channel associated with the called station set. The data is circulated unidirectionally around the loop, being stored and regenerated, $m$ bits at a time, by the intervening stations until it is extracted, $m$ bits at a time, by the called set. Return information is similarly inserted by the called set in the channel associated with the station set originating the call.

Supervisory information is transmitted to and from station sets in much the same way as data. Logic within the sets is arranged to detect incoming calls, actuate the station ringer, and provide a ringback indication. Logic in a called set is also provided to identify the calling station, so that return signals may be inserted in the proper channel. Thus, the loop and associated station sets are capable of performing both the transmission and switching functions normally provided by prior art private branch exchange telephone systems.

By the advantageous arrangement, in accordance with the principles of the invention, of a closed loop communication system wherein the $n \times m$ bit memory capability of the stations is sufficient to store all information on the loop, additional memory capacity is not required. Accordingly, a station set may be added to the system simply by breaking the loop and serially inserting the station, without the need for expensive and time consuming modifications to equipment on other parts of the loop. Since each station set includes a data repeater, system requirements in regard to tolerable loop propagation delay may be based on the distance between adjacent stations, rather than the more stringent limitations on total loop length necessitated by certain prior art systems. Furthermore, since each of the station sets is arranged to process, in a similar manner, both supervisory signals and data appearing in the channel assigned thereto, the inefficiency associated with separate bit positions per channel dedicated only to signaling is eliminated.

BRIEF DESCRIPTION OF THE DRAWING

The aforementioned and other features and advantages of the instant invention will become more readily apparent to those skilled in the art by reference to the following detailed description, when read in light of the accompanying drawing, in which.

DETAILED DESCRIPTION a. General System Operation

Figure 1:
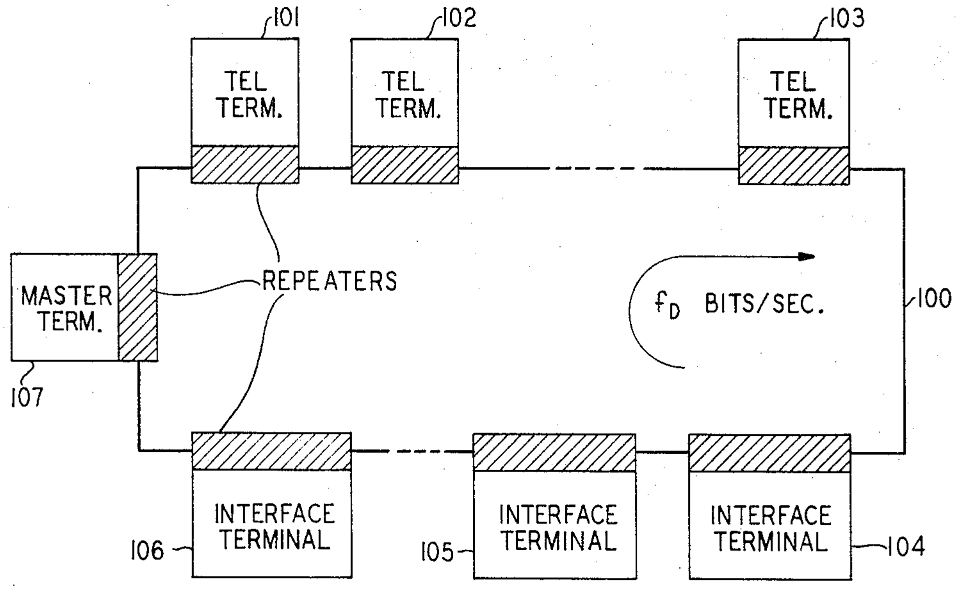
FIG. 1 is a block diagram of a multiplex communication system in accordance with the principles of the invention.

Referring now to FIG. 1, there is shown in block diagram form, a multiplex communication system in accordance with the invention, comprising a unidirectional transmission loop 100, and a plurality $n$ of terminals serially interconnected on the loop. The terminals include $n-1$ station sets, such as station sets 101, 102, and 103, some of which 104, 105, and 106 may be adapted to interface with outside lines, and a master terminal 107.

Figure 2:
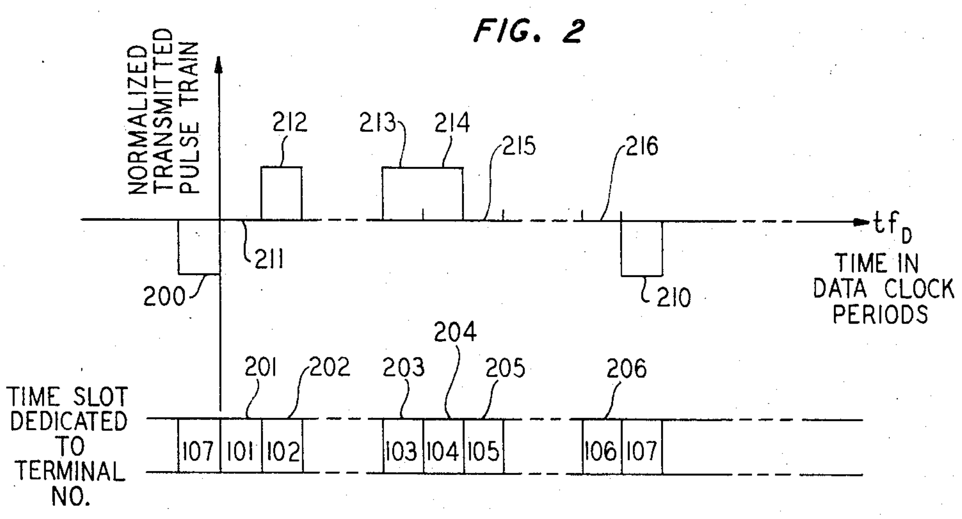
FIG. 2 is a diagram of the time division multiplex channels associated with the system of FIG. 1 and of a typical pulse train which may be inserted in the channels.

Contained within master terminal 107, to be more fully described hereinafter, is a timing generator arranged to transmit on loop 100 a framing indication of width $t$ seconds, such as negative going pulse 200 in FIG. 2, in response to the reception of the preceding framing indication, not shown. A portion of each terminal, shown shaded in FIG. 1, is a tristable circuit, which acts as an $m$ bit repeater. For simplicity of description, the case wherein $m = 1$ will be discussed, although, as will be described later, $m$ may be two or more. Each repeater serves to detect pulse 200, store it (where $m = 1$) for one bit width $t$, and reinsert it on loop 100, so that the elapsed time between pulse 200 and the succeeding framing indication, pulse 210, neglecting propagation delay around the loop, is divided into $n-1$ time division multiplex channels of width $t$. Each of these channels is uniquely associated with a particular terminal, and contains its receive pulse train, one bit per frame, since $m = 1$. Thus, as shown in FIG. 2, channel 201 contains the receive information intended for station set 101, channel 202 contains the receive information intended for station set 102, and so on, channel 206 being associated with set 106. The pulse train, in addition to framing indications such as negative going pulses 200 and 210, includes data inserted on loop 100 by the station sets, in the form of positive going pulses, such as pulses 212, 213, and 214, and of zero level pulses, such as pulses 211, 215, and 216, as shown in the channels corresponding to station sets 101, 105, and 106. These positive going and zero level pulses which may represent either supervisory signals or data, are also repeated by the tristable circuits within each terminal, so that there results a continuously circulated unidirectional digital bit stream on loop 100.

Again confining system description to the case where $m = 1$, each station set is arranged to convert information originating thereat, if analog, to a digital format, and to insert the data, one bit per frame, into the circulating bit stream in the channel corresponding to the called station set. Supervisory signals originating in a station set are also digitally encoded and treated in like manner as data. Hence, if set 101 wishes to communicate, for example, with set 106, data is inserted in the circulating bit stream in each successive appearance of channel 206. As the information proceeds around loop 100 in the direction shown in FIG. 1, the bit stream is simply regenerated and repeated by each tristable circuit within station sets 102 through 105 without any change in the data content of channel 206. At station 106, the digital information in channel 206 is extracted, one bit per frame, and reconverted, if appropriate, to analog form. Return information, in the example given, is inserted by station set 106 in channel 201 of the bit stream, and circulates through master terminal 107 to station set 101, where it is extracted.

By the advantageous arrangement, in accordance with the invention, wherein the $m$ bit storage capacity of the individual station sets is the same as the number of bits inserted or extracted by the sets during each frame period, the $m \times n$ bits of data comprising a frame which appear on loop 100 at any particular time can be stored within the tristable repeater portions of each of the $n$ terminals on the loop. Consequently, additional memory capacity is not required, and, if desired, additional station sets may be added to the system simply by breaking the loop and serially inserting the added set. If it is desired to arrange the station sets to insert and extract two (or more) bits of data at a time, sufficient station storage capacity would be provided by configuring the repeater circuits in each station to store data for two (or more) bit intervals, again obviating the need for additional loop storage capability.

b. Station Set Description

Figure 3:
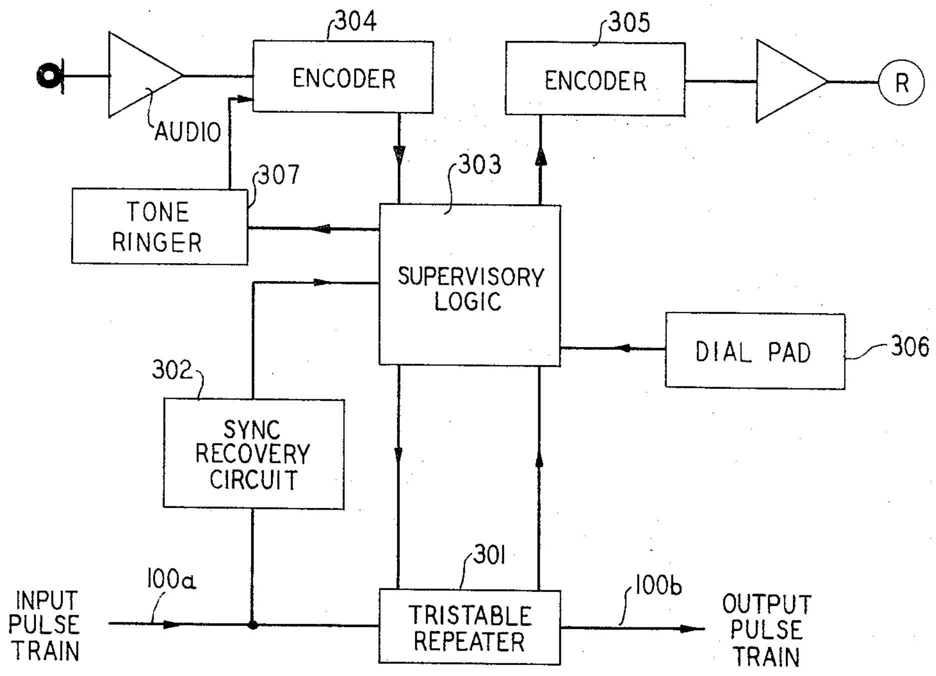
FIG. 3 is a block diagram of an individual station set in accordance with the invention.

A block diagram of an individual station set in accordance with the invention is shown in FIG. 3. The set can be divided into three major parts: (1) a tristable repeater, 301, already mentioned, which includes a sync recovery circuit 302, (2) supervisory logic 303, and (3) the encoder 304 and decoder 305 circuits, which serve to convert analog input signals to a suitable digital format and vice-versa. In cases where the system is designed for telephone applications, a touch dial pad 306 or other similar input signalling device may provide dialing information to the supervisory logic, while a tone ringer 307 or other sounder may be provided to convert certain supervisory output signals to an audible indication.

Supervisory logic 303, to be described more fully hereinafter, uses the clock output of sync recovery circuit 302 derived from the mark pulse as transmitted on loop 100 (input line 100*a*) for timing, and monitors the contents of repeater 301 for pertinent data intended for the station set. Output data is reconverted to analog form by decoder 305, while supervisory signals are acted upon within the supervisory logic. The supervisory logic can also selectively change the data in repeater 301 by inserting the output pulse train of encoder 304 during an appropriate time period of each frame, or by inserting supervisory signals generated within the station set. The station set output appears on line 100*b*.

1. Repeater Portion

Figure 4:
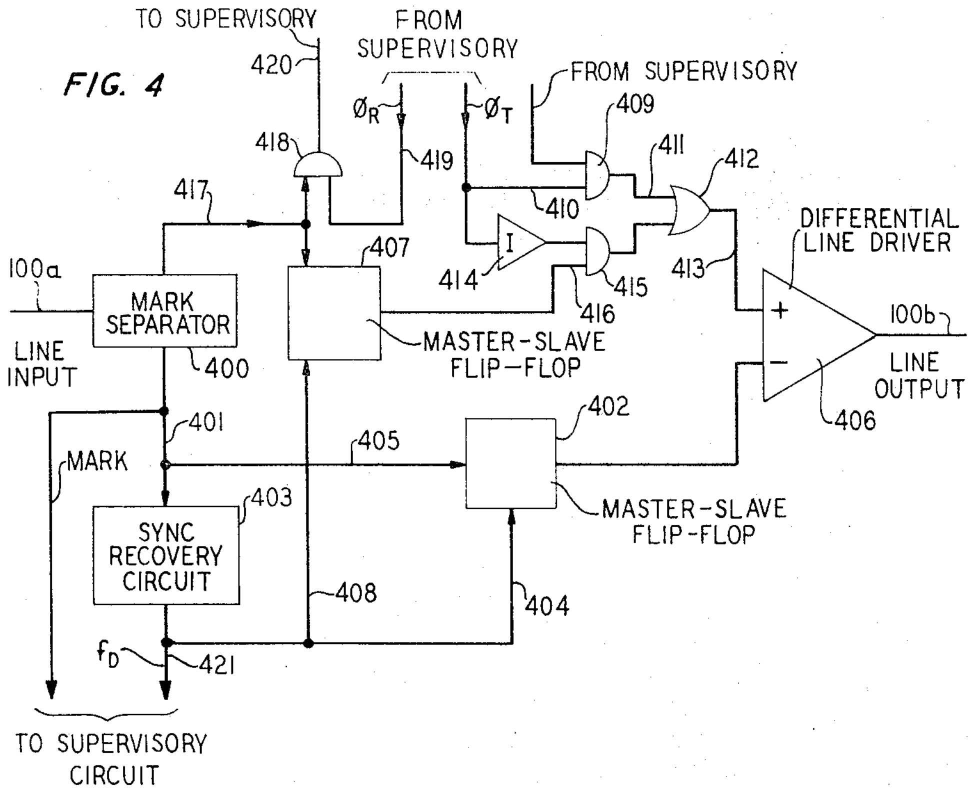
FIG. 4 is a block diagram of the tristable repeater portion of the station set of FIG. 3.

FIG. 4 shows, in block diagram form, the tristable repeater 301 of FIG. 3. The incoming trilevel pulse train on line 100*a* is first separated, in any well known manner, into two bilevel trains, by a mark separator 400. One pulse train, on line 401, consists of inverted framing indicators such as pulses 200 and 210, and is applied in parallel to the input terminals of master slave flip-flop 402 and sync recovery circuit 403. The latter circuit simply extracts timing information from the framing indications, and provides on line 404 a readout signal to flip-flop 402, so that each framing indication applied to the flip-flop on line 405 is stored for one-bit interval (whre $m = 1$) and then inverted by differential line driver 406 and reinserted on loop 100 at output terminal 100b. In a similar manner, the output of sync recovery circuit 403 provides a readout signal to master slave flip-flop 407 on line 408.

During "transmit" time intervals, a $\phi_T$ signal generated by supervisory logic 303 is applied to one input terminal of AND gate 409 on line 410, enabling the gate to pass signals generated by encoder 304 or supervisory logic 303 to output line 411 and thence through OR gate 412 to the positive input terminal 413 of differential line driver 406. The latter simply applies the output to line 100*b*, as a positive going pulse, or as a zero level pulse, depending upon the data level. At all times when the station set is not transmitting, the $\phi_T$ signal applied to inverter 414 enables AND gate 415 to pass signals applied to input terminal 416, the latter signals being the output of master slave flip-flop 407, which in turn represent the original data input signal as delayed by flip-flop 407.

The pulse train on line 417 consists of data or supervisory signals (i.e., positive level pulses such as pulses 212, 213, and 214 and zero level pulses such as pulses 211, 215, and 216 of FIG. 2) and is applied in parallel to one input terminal of AND gate 418 and to master slave flip-flop 407. The remaining input terminal of AND gate 418 is connected to the $\phi_R$ output 419 of supervisory logic 303, which is arranged to be high during the portion of each TDM frame period when data is to be received. Thus, at the appropriate point in each frame, input data is supplied to supervisory logic 303 on the line 420 output of AND gate 418.

In summary, it can be seen that when the station set associated with the apparatus of FIG. 4 is neither receiving nor transmitting, both the data pulse train and the framing indication pulse train are delayed in master slave flip-flops 407 and 402, respectively, and recombined, unaltered, in differential line driver 406 for reinsertion on loop 100. When receiving, data is extracted via AND gate 418, while then transmitting, data is inserted via AND gate 409. It is to be noted that synchronization at the data rate $f_d$ for other set functions, in addition to flip-flop timing, is provided by sync recovery circuit 403 on line 421. The circuit may comprise a crystal clock, phase locked to the input signal framing indication on an asynchronous frame-to-frame basis.

2. Supervisory Circuit

As stated previously, supervisory circuit 303 monitors the pulse stream going through the tristable repeater portion of each station set, detecting and extracting pertinent intra-system supervisory signaling, inserting other supervisory information, and controlling the information flow to and from the encoder and decoder. To better appreciate the operation of this circuitry, a flow diagram of the various supervisory states of a typical station set is shown in FIG. 5.

State A is an idle state, and state D corresponds to bidirectional communication. The D state is reached through states $B\bar{I}$ and $C\bar{I}$ when originating a call, or through states BI and CI when receiving an incoming call. For call origination, an "off-hook" condition switches the circuitry to the $B\bar{I}$ state. The supervisory circuit then monitors the called time slot, as selected by signals provided by a touch dialing pad or other similar input device, until a lack of data (LOD) condition is detected, indicating an idle called station. At the same time, a special coded sequence such as an alternating string of binary ones and zeroes is inserted in the calling station's time slot, indicating a busy condition to all other stations on the loop. The LOD signal switches the station to the $C\bar{I}$ state. A code is then inserted in the time slot of the called station, one bit per frame, identifying the calling station's slot number. At the end of the identification sequence, the supervisory circuitry goes to the D state. As mentioned previously, bidirectional communication then proceeds, data in the calling station's slot being sent to its decoder and the encoder output being inserted in the called station's time slot. If, at any time during call origination, an on-hook condition is perceived by the supervisory logic, an abandoned call condition exists, and the circuit is reset to the A state, as shown in FIG. 5.

For call reception, an incoming call is recognized when in the A state, by the detection of data in the station's time slot. The supervisory circuit then switches to the BI state, until a calling station's number is detected. Switching to the CI state, the supervisory circuit then activates the tone ringer, or other audible signalling device, and transmits encoded ringback signals to the calling station. When the call is answered, the off-hook condition switches the logic to the D state, thereby enabling bidirectional communication. If during call reception, a loss of data (LOD) condition is perceived, the logic is arranged for automatic reset to the A state, as shown in FIG. 5.

Figure 5:
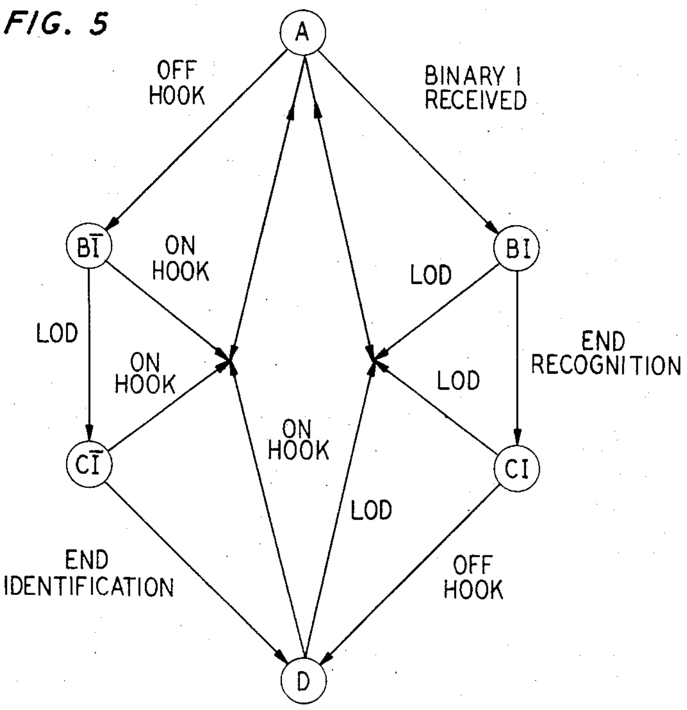
FIG. 5 is a logic flow diagram of the supervisory portion of the station set of FIG. 3.
Figure 6:
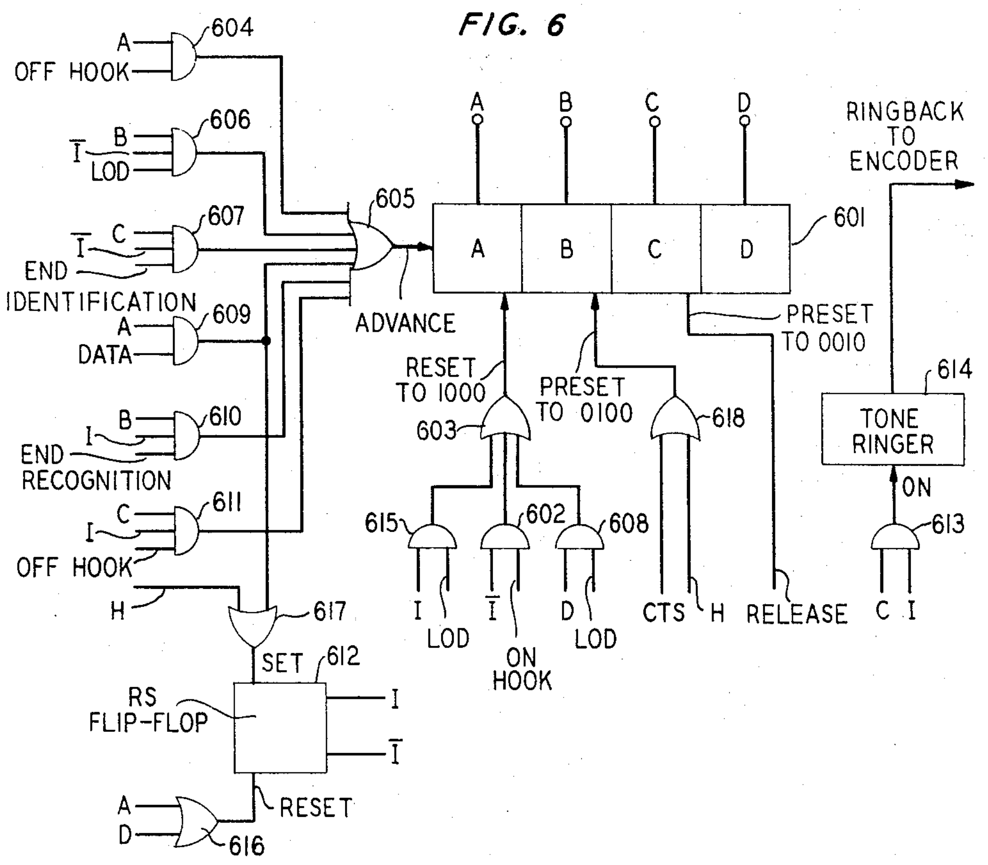
FIG. 6 is a block diagram of the logic circuitry used to implement the flow diagram of FIG. 5.

The supervisory state logic elements corresponding to the flow chart of FIG. 5 are shown in block diagram form in FIG. 6. Four stage shift register 601, having stages corresponding to logic states A, B, C and D, is initially set to the A state, since the $\bar{I}$ and ON HOOK inputs to AND gate 602 are energized when the station set is in its idle condition, the output of AND gate 602 being applied to the shift register 601 reset terminal via OR gate 603. For call origination, the OFF HOOK signal, generated by lifting the receiver, together with the A state input to AND gate 604, causes shift register 601 to switch to the B state via an advance pulse transmitted through OR gate 605. The time slot of the called station, entered by the touch dial pad, is next monitored for an idle condition. If the called channel is idle, the LOD and $\bar{I}$ inputs to AND gate 606 go high, thereby advancing shift register 601 to the C state. At this time, an identification code, to be explained more fully hereinafter, is inserted in the called station's time slot, indicating the channel number associated with the station placing the call. At the conclusion of this sequence, the end identification input to AND gate 607, as well as the C and $\bar{I}$ inputs, are high, advancing shift register 601 to the D state, and thereby enabling bidirectional communication. Shift register 601 is reset to the A state if, at any time during the call origination process, the receiver is returned to its cradle, since both inputs to AND gate 602 are then high. Once communication is begun in the D state, a lack of data (LOD) will also reset shift register 601, via AND gate 608 and OR gate 603.

For call reception, AND gates 609, 610, and 611 are used. In the A state, detection of data on the station's time slot causes the output of AND gate 609 to go high, advancing shift register 601 to the B state. At the same time, the output of gate 609 is also used to set RS flip-flop 612, so that its I output terminal is high. As will be explained in more detail subsequently, the station now receives the identification code from the calling station, following which an end recognition signal is applied to one input terminal of AND gate 610, which, together with the B and I inputs, causes shift register 601 to advance to the C state. At this point, as shown in the lower righthand corner of FIG. 6, both the C and I inputs of AND gate 613 are high, thereby turning on the station's tone ringer 614 or other similar audible output signalling device. When the call is answered by lifting the receiver from its hook, the off-hook signal applied to one input terminal of AND gate 611, together with the C and I inputs, cause its output to go high, advancing shift register 601 to the D state and enabling bidirectional communication. Shift register 601 is reset to the A state if, at any time during the call reception process, data continuity is broken, since both the LOD and I inputs to AND gate 615 are then high.

RS flip-flop 612 which, as mentioned previously, is set by the output of AND gate 609, is returned to the $\bar{I}$ condition by reset inputs applied via OR gate 616 in the A or D states. As will be explained later, a call hold feature may be provided, in which case a hold signal H is used to set flip-flop 612 via OR gate 617, and to preset shift register 601 to the B state via one input to OR gate 618. A call transfer feature, also described hereinafter, utilizes the CTS signal input to OR gate 618 for presetting shift register 610 to the B state. In addition, a release signal generated during a call transfer sequence, also described hereinafter, is used to preset shift register 601 to the C state.

Figure 7A:
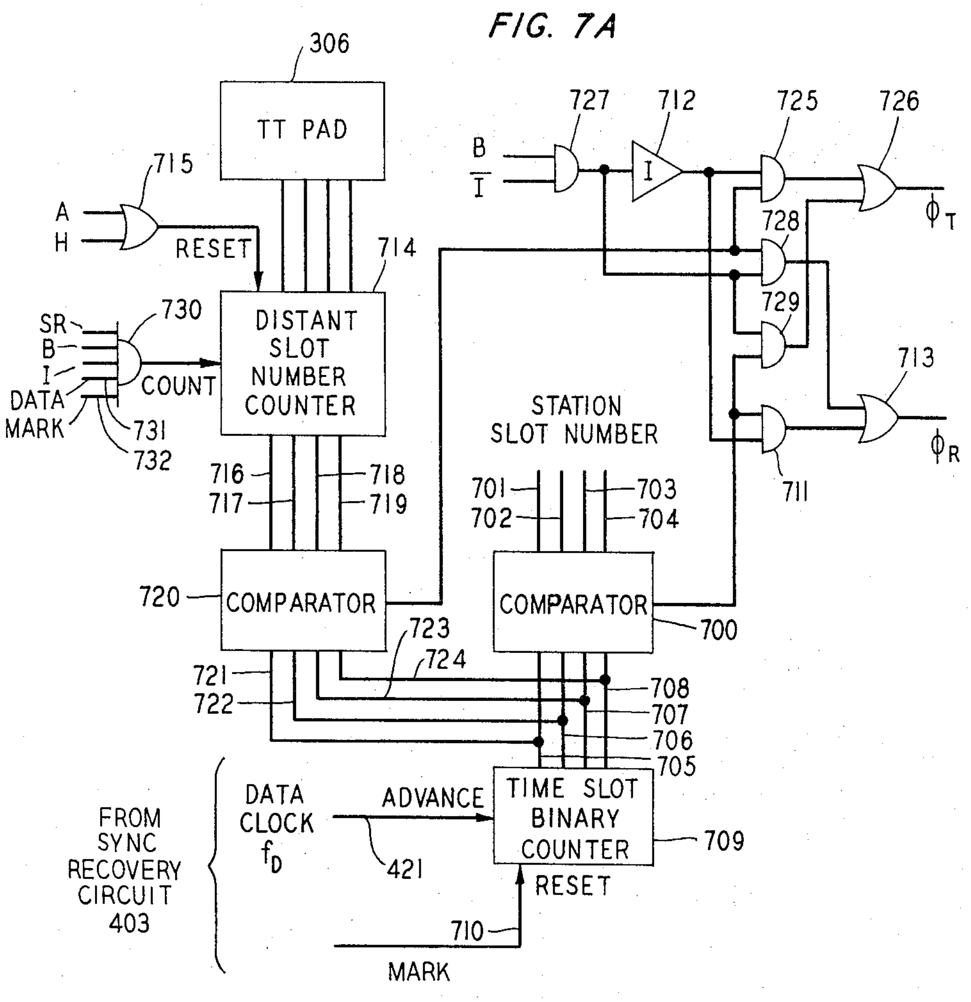
FIG. 7*a* is a block diagram of supervisory apparatus in accordance with the invention, used for generation of transmit and receive timing pulses.

Referring now to FIG. 7*a*, there is shown in block diagram form the portion of supervisory logic 303 used to generate the $\phi_T$ and $\phi_R$ timing signals used, as mentioned previously, to control the insertion into, and extraction of data from, decoder 305 and encoder 304, respectively. Generation of the $\phi_R$ receive pulse is accomplished by assigning to each station set a particular TDM time slot, via one set of input termina, such as terminals 701, 702, 703, and 704 of a logical comparator 700. The other set of comparator input terminals, such as terminals 705, 706, 707 and 708, are connected to the output lines of a binary time slot counter 709. The latter, which is reset at the beginning of each frame period by framing indications received on input line 710, is advanced by the line 421 output of sync recovery circuit 403 at the data rate *fd*. Thus, when the TDM time slot corresponding to the station set's time slot is reached, an output pulse is generated by comparator 700, and applied to one input terminal of AND gate 711. The remaining AND gate 711 input terminal is connected to the output of inverter 712, which is high when supervisory logic 303 is in all but the $B\bar{I}$ state. Thus, for all supervisory states except the $B\bar{I}$ state, the $\phi_R$ output of OR gate 713 appears at each occurrence of the TDM time slots associated with the station set, thereby enabling, as described previously, extraction of data intended for the station.

The means used to generate the $\phi_T$ transmit pulse depends upon whether the station set is originating or receiving a call. In the former case, the called station set's number is simply inserted in distant slot number counter 714 by touch dial pad 306, which may comprise a conventional binary encoder, counter 714 being initially reset in the A state by the high output of OR gate 715. The counter 714 outputs are connected to one set of input terminals, such as terminals 716, 717, 718, and 719 of a second comparator 720, similar to comparator 700. The remaining set of comparator input terminals, such as terminals 721, 722, 723, and 724, are connected to the output lines of binary time slot counter 709. Thus, when the TDM time slot corresponding to the called station set's time slot is reached, an output pulse is generated by comparator 720, and applied to one input terminal of AND gate 725. The remaining AND gate 725 input terminal is connected to the output of inverter 712, which, as stated previously, is high when supervisory logic 303 is in all but the B$\bar{I}$ state. Thus, for all supervisory states except the B$\bar{I}$ state, the $\phi_T$ output of OR gate 726 appears at each occurrence of the TDM time slot associated with the called station set, thereby enabling, as described previously, insertion of data intended for that station.

As mentioned previously, when a station set originating a call is in the B$\bar{I}$ state, a busy code must be inserted in the station's own TDM time slot, to indicate its condition to other stations on the loop. Additionally, the called station's time slot must be monitored for an idle (LOD) condition. Accordingly, in this state only, it is advantageous to reverse the $\phi_T$ and $\phi_R$ timing signals, so that the former occurs in the time interval associated with the calling station, and the latter occurs in the time interval associated with the remote (called) set. This reversal is accomplished by applying the output of AND gate 727, which is high only in the B$\bar{I}$ state, to one input terminal of both AND gates 728 and 729. The remaining input of AND gate 728, which is high during the time slot associated with the called station since it is connected to the output of comparator 720, thus produces a high output of AND gate 728 and a $\phi_R$ pulse from OR gate 713 during the appropriate time interval associated with the called station. In a similar manner, the remaining input of AND gate 729, which is high during the time slot associated with the calling station since it is connected to the output of comparator 700, produces a high output of AND gate 729 and a $\phi_T$ pulse from OR gate 726 during the appropriate time interval associated with the calling station set.

Generation of the $\phi_T$ transmit pulse is slightly more complicated, in the situation where the station set is receivining an incoming call, since the TDM time slot associated with the calling station must be detected and entered into distant slot number counter 714. This process is enabled by the use of AND gate 730, having B, I, Data, Mark and SR input terminals. To better understand the operation of AND gate 730, and the means provided to encode the TDM time slot number associated with the calling station set, reference to FIG. 7*b*, which depicts in block diagram form, the signaling detector portion of supervisory logic 303, is considered helpful.

Figure 7B:
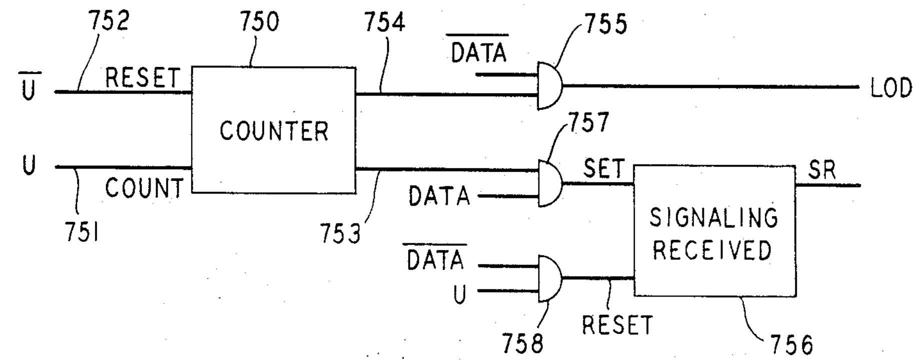
FIG. 7*b* is a block diagram of a signalling detector circuit in accordance with the invention.

As shown in FIG. 7*b*, counter 750, which may comprise a conventional 8 stage binary counter, is provided with a count input terminal 751, and a reset input terminal 752, as well as a pair of output terminals 753 and 754 which are arranged to go high when counter 750 attains counts of 64 and 256, respectively. These counts are chosen arbitrarily (as will be more fully explained hereinafter) to indicate what may generally be designated as abnormal data conditions. More specifically, input terminal 751 is connected to the "U" output of decoder 305, which output, to be subsequently described in more detail, is high when successive data bits in the TDM time slot associated with the station set are of the *same* polarity. Thus, for example, when the station set is in the B$\bar{I}$ state, and is monitoring the time slot associated with the called station for an idle condition, a pair of successive zero bits produce a U signal and advance counter 750 to the count of 1. The next zero bit, and each succeeding zero bit, again produces a high input on input terminal 751, and further increases the count of counter 750. After 257 consecutive zero bits in the time slot associated with the called station, a number considered high enough to indicate with relative certainty that that station is indeed idle, counter output terminal 754, which is connected to one input terminal of AND gate 755, goes high. At the same time, the $\overline{DATA}$ input to AND gate 755 is high, since the last data bit applied thereto is a zero level pulse, so that the output of AND gate 755 is also high, thus producing the lack of data (LOD) signal needed to switch supervisory logic 303 to the C$\bar{I}$ state. By comparison, had the pulse train been a train of 257 consecutive positive level bits, the counting sequence would proceed as heretofore described, but the final pulse, when inverted and applied to AND gate 755, would disable the gate and inhibit the production of a LOD signal. Similarly, if the zero level pulse train contains one or more positive level pulses interspersed therewith, the $\bar{U}$ signal produced by decoder 305 is arranged to reset counter 750 via a reset pulse or input terminal 752.

Counter 750, in conjunction with signaling received flip-flop 756, also serves to detect a signaling sequence generated by a remote station set which indicates its assigned TDM time slot number. For this purpose, as will be explained more fully hereinafter, each station set if arranged to insert in the called station's time slot, a code consisting of 65 consecutive positive level bits followed by a further string of positive bits equal in length to the calling station's number, followed, in turn by a zero level bit. In a similar manner to that previously described, the first pair of successive positive bits produces a U signal which advances counter 750 to the count of 1. The next positive bit, and each succeeding positive bit, again produces a high input on input terminal 751, and further increases the count of counter 750. After 65 positive level bits in the time slot associated with the called station, a number considered high enough to preclude the possibility of false interpretation, counter output terminal 753, which is connected to one input terminal of AND gate 757, goes high. At the same time, the DATA input to AND gate 757 is high, since the last data bit (and therefore all 65 bits) applied thereto is a positive level pulse, so that the output of AND gate 757 is also high, thus transmitting a set signal to flip-flop 756 and providing a high SR output therefrom. Flip-flop 756 remains in the set condition until reset by the occurrence of at least two consecutive zero level pulses which produce high $\overline{DATA}$ and U inputs to AND gate 758.

Returning now to FIG. 7*a*, it will be seen that the SR, B and I inputs to AND gate 730 are each high when the station set is in the BI state, and when the 65 successive positive level pulses preceding the calling station identification code have been received. Each succeeding positive pulse, on DATA input terminal 731 therefore enables AND gate 730 to provide an output count pulse to counter 714, in the presence of a high input signal on MARK input terminal 732. Stated differently, AND gate 730 is arranged to provide a count signal to counter 714, once during each frame period (after 65 consecutive positive level pulses) during which there is a positive level pulse in the time slot associated with the called set, the total number of count signals being indicative of the time slot associated with the calling station set. At the end of the identifying sequence, the zero level bit is detected as an end recognition indication, resulting in an advance of shift register 601 to state C, thereby disabling the B input to AND gate 730, and fixing the count in counter 714. Flip-flop 756 is reset by the first received sequence of two zero level bits. For all succeeding frame periods, $\phi_T$ signals from OR gate 726 are thus produced in the appropriate TDM time slot associated with the remote station set, as heretofore explained.

Figure 8:
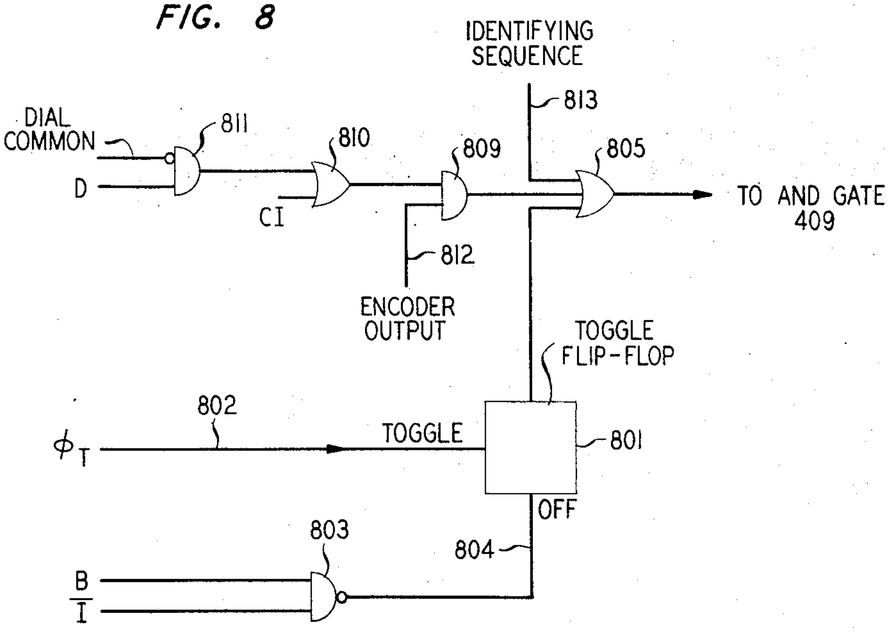
FIG. 8 is a block diagram of the supervisory apparatus used for transmit data generation.

Turning now to FIG. 8, there is shown in block diagram form the portion of supervisory logic 303 used for busy signal and transmit data generation. As will be recalled, a station set originating a call, when in the B$\bar{I}$ state, inserts an alternating string of positive level and zero level pulses in its own TDM time slot, in order to indicate its busy status to other stations on the loop. This alternating bit stream is provided by toggle flip-flop 801, which is arranged to switch between high and low output states during succeeding time slots under the control of $\phi_T$ input signals on input terminal 802. In states other than B$\bar{I}$, the output of NAND gate 803 is high, thereby disabling flip-flop 801 via OFF terminal 804. The output of flip-flop 801 is supplied to the loop via OR gate 805, and AND gate 409 of FIG. 4.

In the CI state, tone ringer 614 is activated, which in turn supplies a ringback signal to encoder 304, where it is digitally encoded. Transmission to the calling station is provided by connecting the encoder output to one input terminal of AND gate 809, the other input terminal of which is energized by the output of OR gate 810 when in the CI state.

A second input to OR gate 810, which enables AND gate 809 and permits the encoder output to be supplied to AND gate 409 via OR gate 805, is provided from the output of AND gate 811. The latter is actuated, in the supervisory D state, provided that there is no output of touch dial pad 306 of FIG. 3, which is detected by a low dial common output, to be subsequently explained. If the dial pad or dial common output is high, as, for example, when a station set interfacing with an outside line is dialing to the central office, or when an identifying sequence is being transmitted, its inverted output applied to one input terminal of AND gate 811 disables the latter, as well as OR gate 810 and AND gate 809, so that the encoder output on line 812 is not transmitted.

OR gate 805 is supplied, in addition to the inputs from AND gate 809 and flip-flop 801, with an identifying sequence input on line 813. Generation of this input may best be understood with reference to FIG. 9, which shows, in block diagram form, the identification code generator. As explained previously, it is considred advantageous to encode the calling station's slot number in the form of a consecutive series of 65 positive level bits followed immediately by a further series of positive bits equal in length to the calling station's slot number, followed in turn by a zero level bit. These bits are inserted, one per frame into the called station's assigned time slot, and extracted and decoded, as previously explained, by the apparatus of FIG. 7*a*.

Generation of the identification sequence begins in AND gates 901, 902, 903 and 904, one input terminal of which is each connected to line 905, which is high in the C$\bar{I}$ supervisory state. The remaining input terminal of each of the AND gates is connected to line 701, 702, 703 and 704, which, as discussed in conjunction with FIG. 7*a*, is in turn hard wired to appropriate voltage sources which permanently represent the station's assigned slot number in binary form. It is, of course, to be understood that while AND gates 901–904 are illustrated, the required number of such gates must be sufficient to provide a different binary code for each station set on the loop.

The outputs of AND gates 901 through 904 are applied to one input terminal of OR gates 906 through 909. respectively, and thence into one set of input terminals of comparator 901. The outputs of OR gates 906, 907, 908 and 909 are each also applied to the input of OR gate 911, and, since at least one of the inputs is high, the output of OR gate 911 one line 912 is also necessarily high. Line 912, which provides the dial common signal of FIG. 8, is applied to one input terminal of AND gate 913 and one input terminal of AND gate 918. The other input terminal of AND gate 913 receives inverted $\phi_T$ signals from inverter 923, the latter receiving $\phi_T$ signals from the output of OR gate 726. Since counters 917 and 922 were left reset by the output of inverter 931 before the dial common signal on line 912 went high, the end identification (EI) output of comparator 910 goes low as one or more outputs from OR gates 906–909 go high. The output of AND gate 918 therefore goes high, supplying a positive pulse to OR gate 805 on line 813 and thence to one input terminal of AND gate 409. A positive pulse is therefore transmitted, coincident with each $\phi_T$ pulse, through AND gate 409, OR gate 412, and differential line driver 406 to line output 100b. After each transmitted pulse, $\phi_T$ goes low, causing the input to AND gate 913 derived from the output of inverter 923 to go high. The output of AND gate 913, which is connected to one input terminal of AND gate 914, is thus high. In the absence of an end of signalling (ES) signal on line 930, the output of inverter 915 is also high, so that the output of AND gate 914 is driven high. This output, on line 916, is applied to the advance input terminal of signalling counter 917, advancing its count by one. In a similar manner, after each subsequent $\phi_T$ pulse, a positive level remains on line 813, and the count of signalling counter 917 is increased by 1. It should be apparent that the count of counter 917 therefore corresponds to the number of positive level pulses already transmitted as part of the 65 positive pulses of the identifying sequence.

For reasons that will presently become apparent, counter 917 is arranged to produce an output signal ES on line 919 at the instant when 66 positive pulses have been counted thereby. The first 65 of these pulses represent the identifying sequence preceding the station's slot number, and the 66th represents a slot number of at least one. For the purposes of illustration only, assume that the station slot numbered entered in AND gates 901–904 and comparator 910 is 5, so that it is desired to terminate the identifying sequence output of AND gate 918 after 70 consecutive positive pulses. When the 66th advance pulse is applied to the input of signaling counter 917, its output on line 919 goes high. The ES signal thus produced serves to render the output of inverter 915 low, so that AND gate 914 is disabled and signaling counter 917 is inhibited from further counting. Simultaneously, the ES signal is applied to one input terminal of AND gate 920, the other input of which is high in the absence of a $\phi_T$ pulse. The output of AND gate 920, which is applied to the advance input terminal 921 of identifying code counter 922, advances that counter to the count of 1.

The 67th, 68th, 69th and 70th $\phi_T$ pulses applied to AND gate 409, produce, in a similar manner to that described above, output pulses 67 through 70 on line 100*b*, followed by advance signals to counter 922. After the 70th transmitted pulse of the identification sequence, the count in counter 922 goes to 5, yielding a positive comparison in comparator 910 and a high EI output therefrom. The inverted EI signal, applied to AND gate 918 via inverter 932, causes its output to go low, so that the output of OR gate 805 is similarly low. Accordingly, for the example given, the identification sequence is appropriately terminated with a zero level pulse transmitted coincident with the next $\phi_T$ pulse after the transmission of 70 consecutive positive level pulses. From the preceding description, the operation of the apparatus of FIG. 9, for other station slot numbers between 1 and 16, will be apparent. It is simply to be noted that in order to design the system for a greater maximum number of station sets, additional AND and OR gates 924, 925, respectively, may be required, as well as an increased capacity in comparator 910 and counter 922. Similar expansion of distant slot number counter 714, time slot counter 709, and comparators 700 and 720 would also be required.

After transmission of the appropriate identifying sequence, supervisory logic 303, as mentioned in connection with FIG. 5, is arranged to switch to the D state. Accordingly, in the usual case, each of AND gates 901–904 is disabled, in turn rendering the outputs of OR gates 906–909 and 911 low. The output of the latter, on line 912, is advantageously inverted by inverter 931, and used to reset both counters 917 and 922. If, in the D state, a further identifying sequence is required for transmission through an interface station to the central office, it may be generated using techniques to be subsequently described, via inputs to AND gates 926, 927, 928 and 929 from touch dial pad 306, in a manner identical to that described above.

Figure 9:
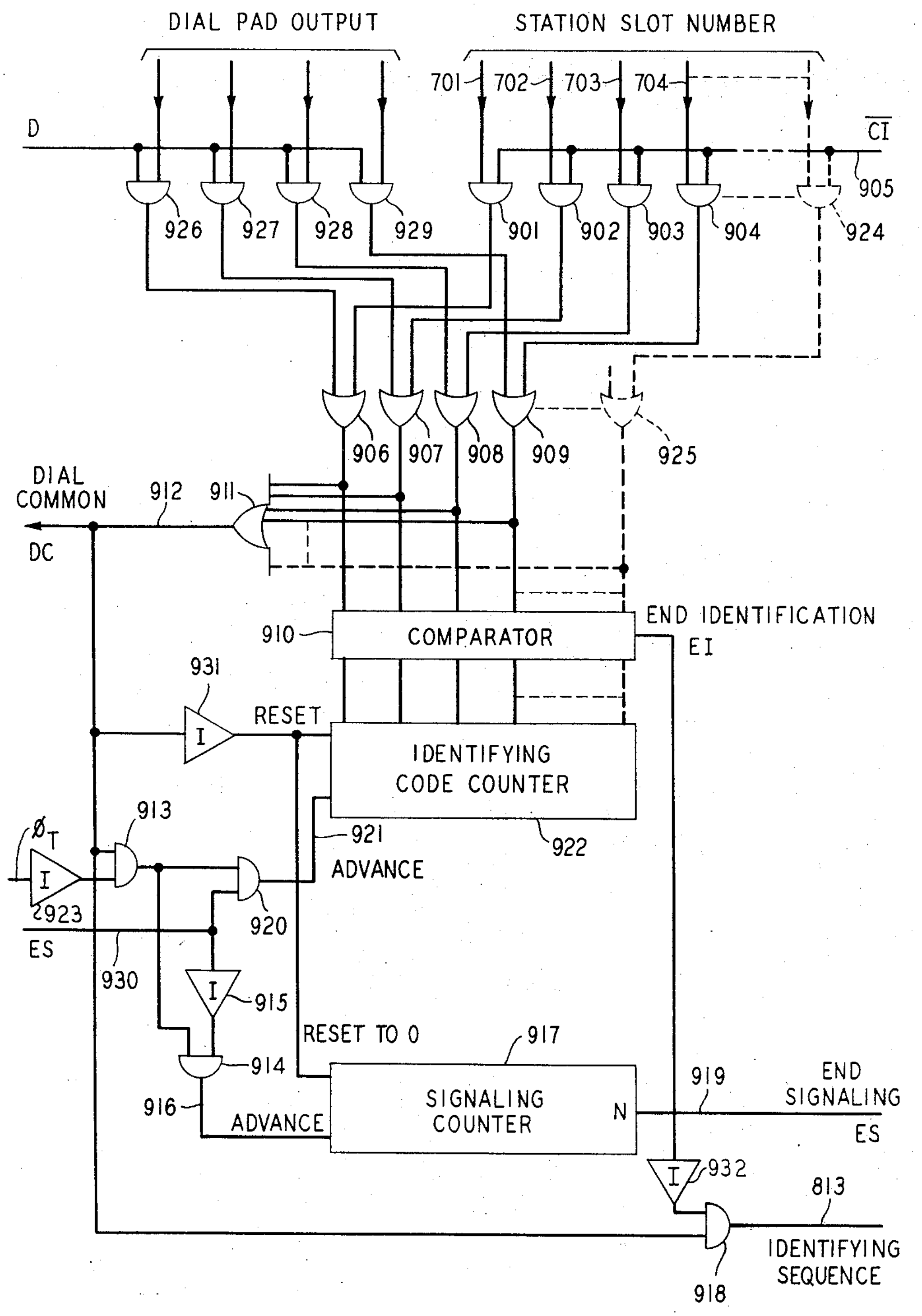
FIG. 9 is a block diagram of the supervisory apparatus used for identifying code generation.

Under most conditions, the dial pad button which identified the called station's time slot number (using the apparatus of FIG. 7*a*) will still be depressed at the time when the apparatus of FIG. 9 switches from the $C\bar{I}$ to the D supervisory states. In this event, the dial common output of OR gate 911 on line 912 should continue to remain high, preventing the reset of signaling counter 917 which would otherwise result in transmission of an undesired second signaling sequence. It is therefore advantageous to incorporates sufficient time delay, using well understood techniques, into OR gate 911, to assure that its output does indeed remain high during the $C\bar{I}$ to D state transition.

3. Codec

Although the multiplex communication system heretofore described will transmit the binary pulse train generated by any conventional digital encoding apparatus, the use of a companded delta modulation codec has been found to be particularly expedient, for several reasons. First, delta modulation apparatus requires a minimum amount of linear circuitry, and is thus compatible with the LSI fabrication techniques by which the entire station set circuitry could be economically manufactured. Second, delta modulation apparatus utilizes a one-bit code, which is well adapted for use in conjunction with the present invention, especially in the case where $m = 1$. Third, companded delta modulation apparatus is self-adapting to changes in the number $n$ of station sets on the loop, since, for a fixed data rate, a reduction in $n$ reduces the amount of possible companding, if time is selected as the variable, but proportionately increases the rate at which station sets are sampled, thereby tending to balance out changes in subjective quality and signal-to-noise ratio.

Various delta modulation encoders and decoders are available to those skilled in the art, and any such decoder may be used in practicing the invention, as long as means are provided for the generation of the U signal, referred to previously, in the presence of consecutive bits of the same polarity. However, use of the codec disclosed in the copending application of D.E. Blahut, entitled "Adaptive Delta Modulation Decoder", Ser. No. 155,582, filed June 22, 1971, is considered avantageous due to its flexibility and simplicity. Since the arrangement and operation of that codec is fully described in that application, the following description, when read in light of FIGS. 10 and 11, may conveniently be brief.

Figure 10:
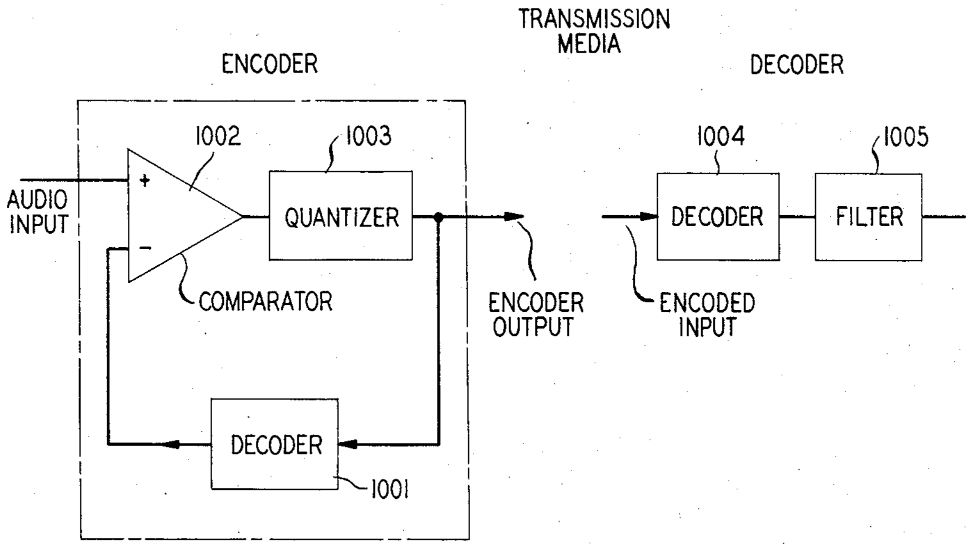
FIG. 10 is a block diagram of a delta modulation codec which may be used in the encoder and decoder portions of FIG. 3.

FIG. 10 is a block diagram of a typical prior art delta modulation encoder. As can be seen therefrom, the encoder includes a decoder 1001 in its feedback path, and a comparator 1002 and quantizer 1003 in its forward path. As is well known to those familiar with delta modulation, the output of decoder 1001 is compared in comparator 1002 with the encoder analog input signal, the polarity of the error signal at the time of sampling determining whether the next pulse generated in quantizer 1003 is a positive level pulse (binary one) or a zero level pulse (binary zero). The transmitted digital bit stream is reconverted to its analog signal equivalent in the remote station set by a decoder 1004 similar to decoder 1001 which may further include a smoothing filter 1005.

Figure 11:
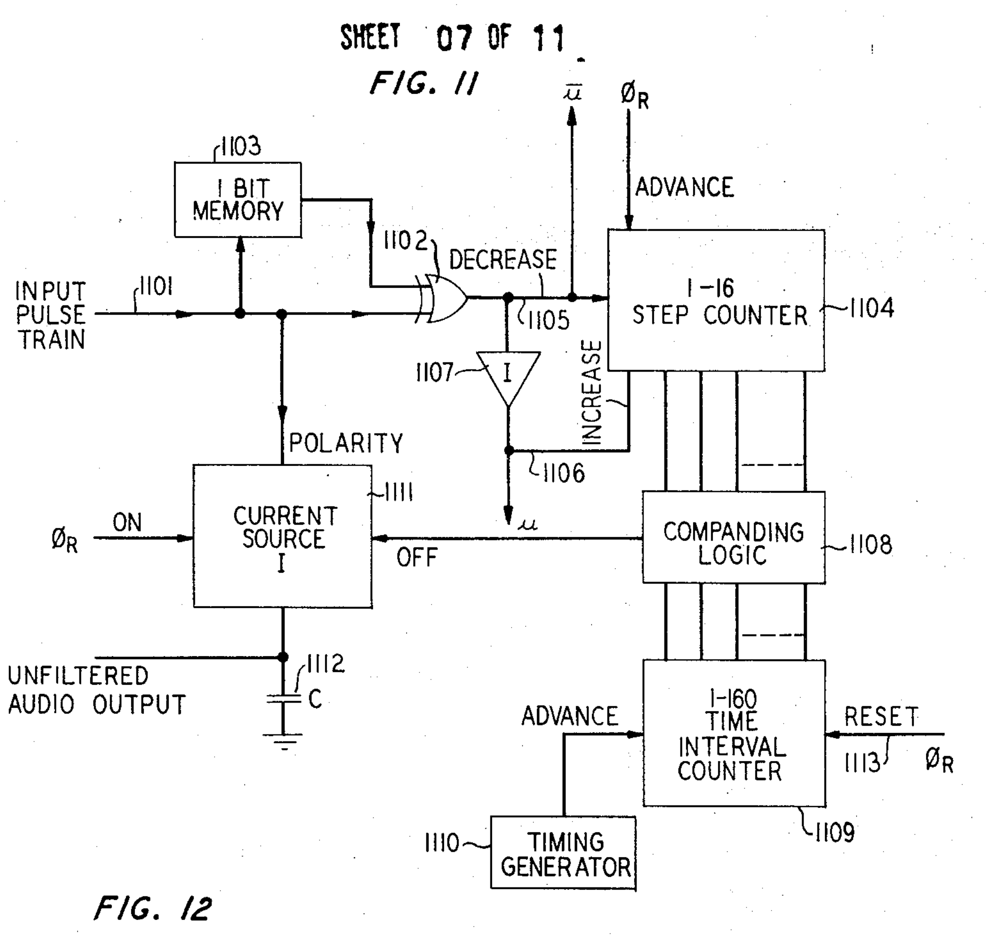
FIG. 11 is a block diagram of the decoder of FIG. 10.

A more detailed appreciation of the operation of decoders 1001 and 1004 may be had with reference to FIG. 11. The digital pulse train input on line 1101 is applied in parallel to one input terminal of exclusive OR gate 1102 and to the input of one-bit memory 1103, the output of which is connected to the remaining input of gate 1102. Accordingly, if a given bit is of a polarity different from the preceding bit, a decoder output closely approximating the analog input signal is present, and a step-size decrease order is transmitted to step counter 1104 on line 1105. Alternatively, if the bit is of the same polarity as the preceding bit, a slope overload condition is assumed, and a step-size increase order is applied to counter 1104 on line 1106 via the output of inverter 1107. It is to be noted that the output of inverter 1107 conveniently supplies the U signal discussed previously in connection with FIG. 7*b*, while the input to inverter 1107 is the $\bar{U}$ signal mentioned above.

Each of the counts of counter 1104 is associated with a desired step-size change and converted to an analog voltage output by means of companding logic 1108, time interval counter 1109, timing generator 1110, current source 1111 and integrating capacitor 1112. More particularly, at the beginning of each bit interval, current source 1111 is turned ON by a $\alpha_R$ signal, the polarity of the current source output being determined by the polarity of the input pulse on line 1101. Thus, capacitor 1112 begins to charge (or discharge). Simultaneously, counter 1109 is reset by the $\phi_R$ signal on line 1113, and begins to count output pulses from timing generator 1110, the latter being arranged to operate at a frequency much greater than that of the $\phi_R$ pulses. For any given count in counter 1104, companding logic 1108 is arranged to supply an OFF pulse to current source 1111 after the occurrence of a predetermined desired number of timing generator 1110 pulses. Accordingly, counter 1109 and companding logic 1108 advantageously serve to convert each of the step sizes represented by the counts of counter 1104 into a corresponding voltage change on capacitor 1112. It is to be noted that counter 1104 may be arranged to accommodate any desired number of possible step sizes, and the correspondence between counters 1104 and 1109 arranged so that each step size may be represented by a desired integral multiple of timing generator 1110 pulses.

b. Interface Station Sets

As mentioned in connection with FIG. 1, one or more station sets, such as sets 104, 105 and 106, may be adapted for interfacing with outside lines, especially in the case where the system is intended for telephone applications. This set, shown in block diagram form in FIG. 12, differs from the station set of FIG. 3 only in the supervisory and audio circuitry. Basic interface station set operation is as follows: When a call originating outside the system is received on line 1201, its presence is detected by ring detector 1202, and supervisory logic 1203, to be described more fully hereinafter, is arranged to route the call to a particular station set on the loop. Appropriately, switch-hook 1204 is actuated by the supervisory logic, so that the incoming data is routed through audio hybrid 1205 to encoder 1206 for digital encoding in a manner similar to that previously described in connection with calls originating on the loop. Return information, once bidirectional communication is established, is routed from supervisory logic 1203 through decoder 1207, hybrid 1205 and switchhook 1204 back to line 1201.

To initiate a call outside of the system, a station set simply calls the slot number associated with an interface station set. Supervisory logic 1203 then actuates switchhook 1204, and dial tone on line 1201 is transmitted to the calling set via hybrid 1205 and encoder 1206. Dialed digits are then received in supervisory logic 1203, converted to standard multifrequency (MF) signals in oscillator 1208, and transmitted to line 1201 via hybrid 1205 and switchhook 1204. Tristable repeater 1209 and sync recovery circuit 1210, shown for the sake of completeness, are identical to their FIG. 3 counterparts.

Figure 12:
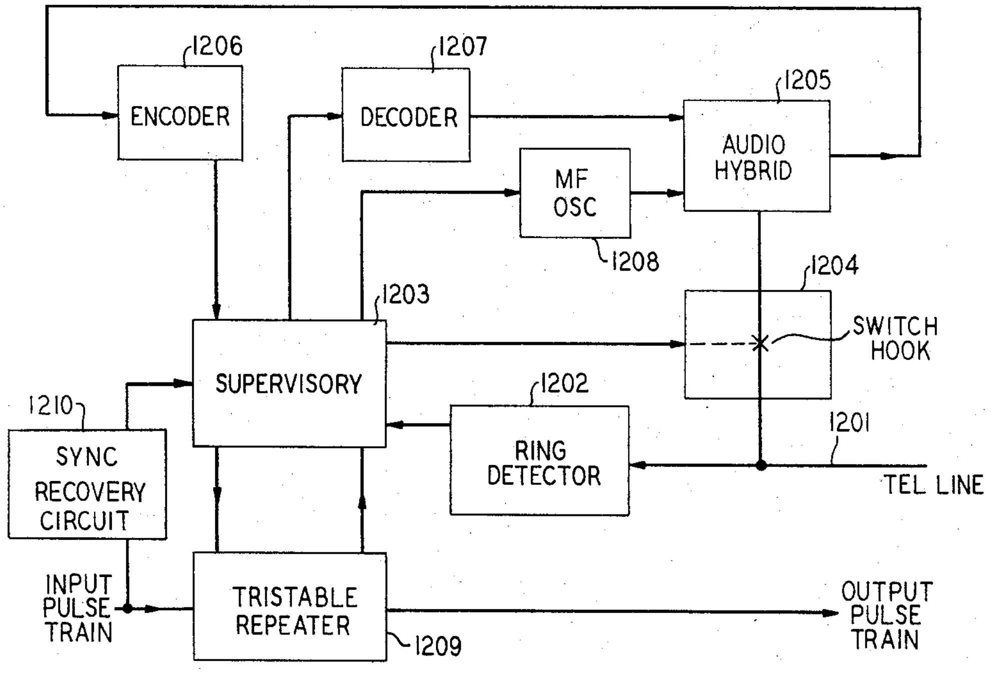
FIG. 12 is a block diagram, similar to FIG. 3, of a line interface station set in accordance with the invention.
Figure 13:
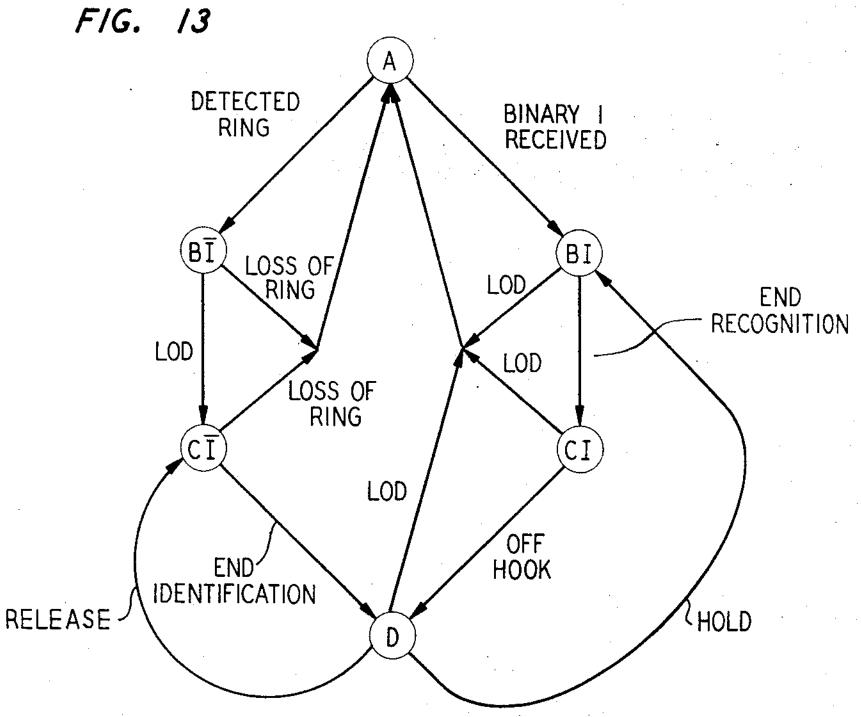
FIG. 13 is a logic flow diagram, similar to FIG. 5, of the supervisory portion of the interface station set of FIG. 12.

A supervisory flow diagram, similar to FIG. 5, for the interface station set of FIG. 12, is shown in FIG. 13. For the case where a station set is calling outside of the loop system, a call to the interface terminal is initiated, causing the latter to switch to the BI state in the presence of data in its TDM time slot. After the interface terminal hsa detected calling party recognition, as previously described, supervisory logic 212 then switches to the CI state. In this state, instead of operating a tone ringer or other similar audible output device, as shown in FIG. 6, supervisory logic 1203 is arranged to actuate switchhook 1204 and proceed to the D state. At this point, the input signal to encoder 1206 is dial tone, which is transmitted to the calling station set. As will be described more fully hereinafter, additional dialing information generated by the calling set is then used to generate multifrequency signals in oscillator 1208 at the interface set. As shown in FIG. 13, a lack of data (LOD) at any time during the call initiation process will cause supervisory logic 1203 to return to the A state.

When the interface station is called by an outside telephone, ringing is detected by ring detector 1202, switching supervisory logic 1203 to the B$\bar{I}$ state, as shown in FIG. 13. In this state, a call is originated on the loop to a predetermined station set, which may be manually attended. The attendant station slot number is hard-wired into the interface unit as parallel entry inputs to distant slot number counter 714, instead of using touch dial pad 306. The TDM time slot associated with this attendant station is monitored for an idle (LOD) condition, which switches logic 1203 to the C$\bar{I}$ state. The interface station is next identified to the attendant station, after which the D state is reached. In the latter state, ringback is monitored and switchhook 1204 closed only upon loss of ringback, which indicates that the call has been answered. As shown in FIG. 13, a loss of ring condition perceived by supervisory logic 1203 before switching to the D state will result in a return to the A state.

As will be discussed subsequently, supervisory logic 1203 is arranged to return to the BI or C$\bar{I}$ states in the presence of hold or release signals, respectively.

Figure 14:
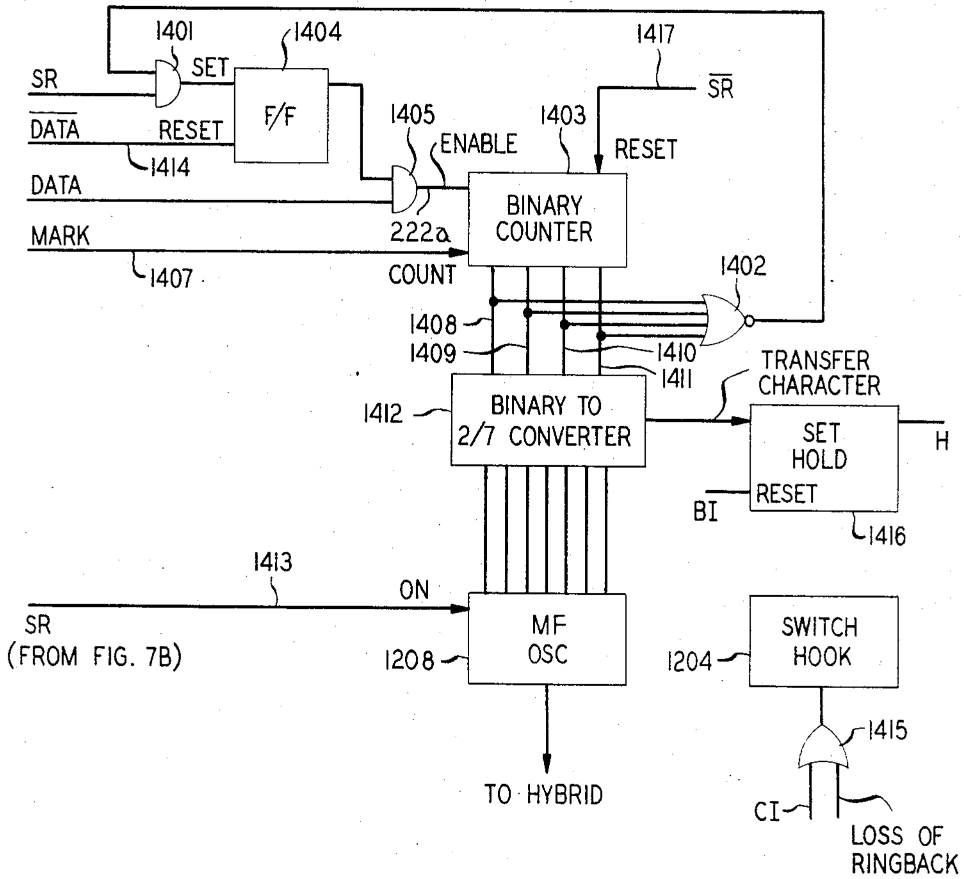
FIG. 14 is a block diagram of the dialing circuitry of an interface station set in accordance with the invention.

This means provided in each interface station set to generate multifrequency dialing signals once an originating station set has received dial tone and is thus in the D state, is shown in block diagram form in FIG. 14. As will be recalled from the previous discussion in connection with FIGS. 7*a*, 7*b*, 8 and especially FIG. 9, the originating station is arranged to encode a dialed digit, in the D state, as a series of 65 consecutive positive level pulses, followed immediately by a further series of positive level pulses equal in length to the digit, and thence by a zero level pulse. These 65 pulses produce, in the interface station, using circuitry identical to that of FIG. 7*b*, an SR signa, which is applied to one input terminal of AND gate 1401. The other input to AND gate 1401 is supplied from the output of NOR gate 1402, which is high when the count in binary counter 1403 is zero, so that the output of gate 1401 produces a set condition in flip-flop 1404. The set output si supplied to one input terminal of AND gate 1405, the other input of which is supplied by the DATA input from the station's decoder. Accordingly, as the string of positive level pulses following the 65th pulse is received in the interface station, it is used to enable counter 1403 on input line 1406, causing the counter to advance once during each frame period in the presence of a MARK signal on line 1407. The count of counter 1403, appearing on output lines 1408, 1409, 1410 and 1411, thus represents the digit dialed by the originating station set, and is converted from binary from to a 2/7 form compatible with conventional MF oscillators, in converter 1412. The outputs of the latter are supplied to the inputs of MF oscillator 1208, which is turned on by the SR signal applied on line 1413. The generated tone is applied to audio hybrid 1205 of FIG. 12, and thence, of course, through switchhook 1204 to telephone line 1201.

Following the beginning of the counting cycle in counter 1403, at least one of the inputs to inverting OR gate 1402 is necessarily high, producing a low output therefrom and disabling AND gate 1401. Accordingly, the SET input to flip-flop 1404 will thereafter remain low, allowing the flip-flop to be reset by the zero level pulse immediately following the identifying sequence via the $\overline{DATA}$ reset input on line 1414. When reset, the output of flip-flop 1404 is, of course, low, so that AND gate 1405 is disabled and counter 1403 is inhibited from further counting. MF oscillator 1208 remains ON until the subscriber at the originating station set releases the depressed button of dial pad 306, at which time the SR signal goes low upon the first received sequence of two zero level bits, turning oscillator 1208 off and resetting counter 1403 via an input on line 1417. The apparatus of FIG. 14 is then ready to repeat the above-described sequence for the next dialed digit.

As shown in the lower corner of FIG. 14, actuation of switchhook 1204 in accordance with the requirements of FIG. 13 is accomplished simply by the provision of OR gate 1415, having CI and LOSS OF RINGBACK inputs. The latter signal may be supplied from a suitable ringback detector provided in supervisory logic 1203, the details of which will be apparent to those skilled in the art.

If the attendant station is not the desired party, the attendant must initiate a call transfer sequence. Basically, this sequence includes the steps of (1) setting the supervisory states of the interface station set and the attendant's station set to the BI and B$\bar{I}$ states, respectively, (2) allowing the attendant station set to assume the identity, for timing purposes, of the interface station set, (3) initiating a call to the desired station set in the normal manner, (4) after an answer is verified, transmitting the desired station's slot number to the interface station set, and (5) finally releasing the attendant station set from the call.

Figure 15A:
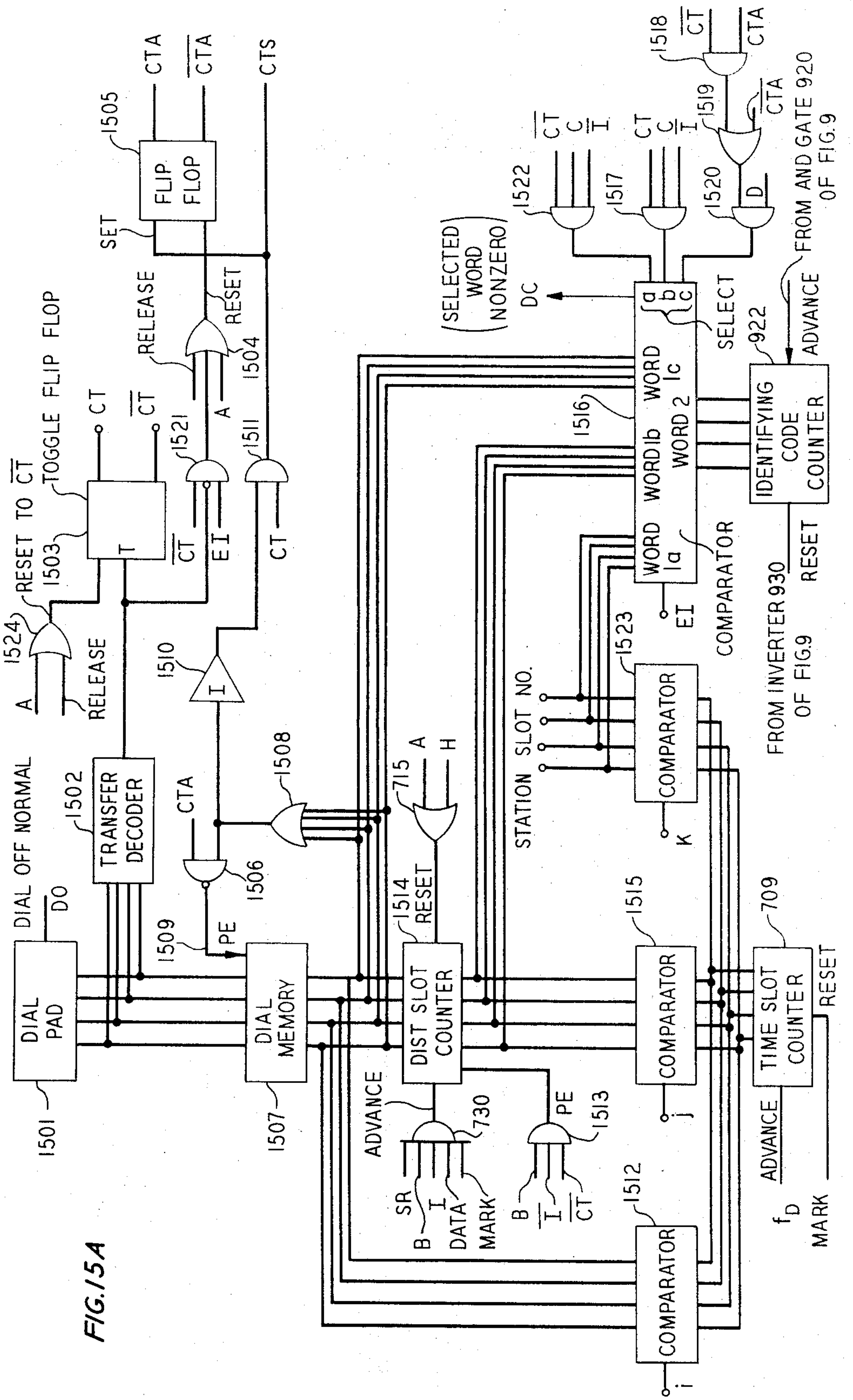
FIG. 15*a* is a block diagram of the call transfer circuit which may be provided in one or more station sets.

The supervisory circuitry used to provide the functions listed above is shown in block diagram form in FIG. 15*a*, which, for ease of explanation, includes the apparatus of FIGS. 7*a* and 9 as well as the additional circuitry required to provide the call transfer capability.

The first call transfer step is initiated when the attendant depresses a predetermined transfer character on dial pad 1501. The character thus generated is transmitted to the line interface station set in a normal manner, as described previously, and is also detected by transfer decoder 1502, which toggles call transfer flip-flop 1503 to the CT state. The identification code corresponding to the transfer character is received by the interface station set in the nromal manner, where binary to 2/7 converter 1412 detects it as a transfer character and sets hold flip-flop 1416 of FIG. 14. Referring to FIG. 6, the H signal thus produced causes supervisory logic 303 to be preset to the B state, and also causes the I output of flip-flop 612 to go high. In FIG. 7*a*, the H signal also produces a high output from OR gate 715, resetting counter 714; returning to FIG. 14, these B and I signals cause hold flip-flop 1416 to be reset. The line interface station set now remains in the BI supervisory state, awaiting an identification signal from the attendant station, identifying the desired party's time slot number.

When the attendant releases the call transfer button, all outputs of dial pad 1501 go low. Since, in the supervisory A state, flip-flop 1505 was initially reset by the output of OR gate 1504, its CTA output is also low. The low CTA signal, applied to one input terminal of NAND gate 1506, causes a high output therefrom, energizing the parallel enable (PE) input of dial memory 1507 on line 1509. Accordingly, the outputs of dial pad 1501, which are all low, are stored in dial memory 1507. The outputs from the latter, applied to the inputs of OR gate 1508, thus result in a low output therefrom, which is inverted in inverter 1510 and applied to one input of AND gate 1511. Since the high CT output of flip-flop 1503 is applied to the other input of AND gate 1511, the output of the latter is high, resulting in a set signal to flip-flop 1505, and a high CTA output therefrom. The CTS output of AND gate 1511 also serves to preset to B, the state of the attendant's supervisory logic, as discussed in connection with FIG. 6. The attendant station set is thus in the B$\bar{I}$ state and call transfer mode.

Figure 15B:
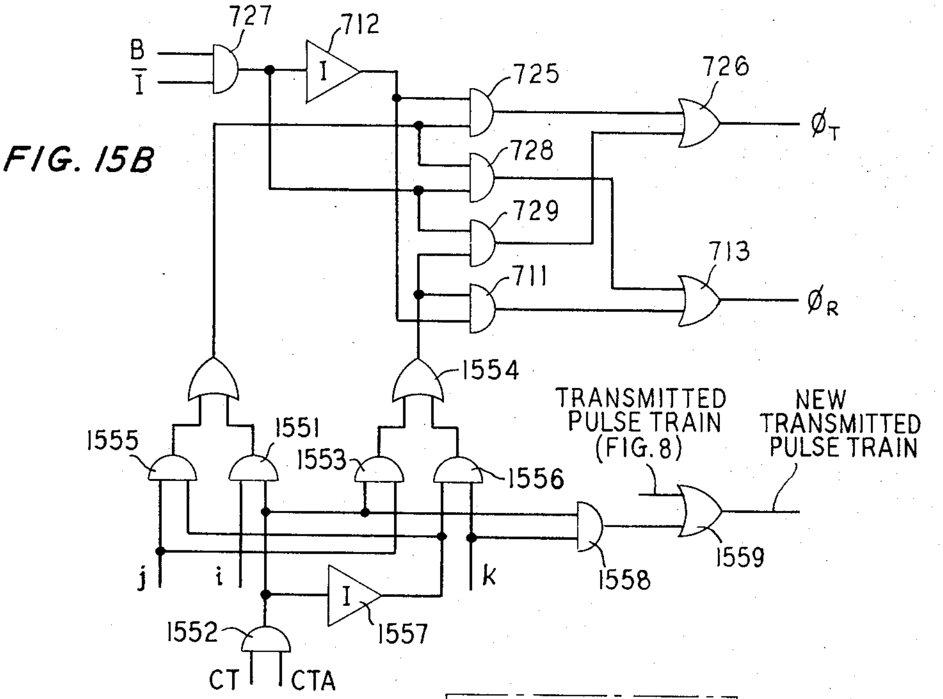
FIG. 15*b* is a block diagram, similar to FIG. 7*a*, of the supervisory apparatus used for generation of transmit and receive timing pulses in a station set equipped with the circuitry of FIG. 15*a*.

To better understand the timing sequences used to accomplish the second step in the call transfer process, the circuitry in the top righthand corner of FIG. 7*a* is redrawn in FIG. 15*b*, with certain additions required for the call transfer capability. Where possible, like elements have retained like designations, as used in FIG. 7.

Referrring to FIG. 15*b*, since the attendant's station set is now in the B$\bar{I}$ supervisory state, one input terminal of each of AND gates 738 and 729 are high, due to the high output of AND gate 727. Also, one input of AND gate 1551 is high, due to the high CTA and CT inputs applied to AND gate 1552. Accordingly, the $\phi_R$ output of OR gate 713 is high during time slots when the *i* output of comparator 1512 of FIG. 15*a* is high. The latter occurs in the time slot associated with the desired station set, since when the attendant enters, on dial pad 1501, the number of the desired station, consistent with step 3 of the call transfer process, it is stored in dial memory 1507 and an *i* output of comparator 1512, one bit per frame, results. Also, at least some of the inputs to OR gate 1508 go high, removing the PE signal from dial memory 1507 and locking the number of the desired station set therein.

Returning to FIG. 15a, it will be noted that, upon initiation of the call transfer sequence, the C$\bar{T}$ input to AND gate 1513 went low before supervisory B$\bar{I}$ state was reached, since flip-flop 1503 is arranged to toggle when the transfer character entered by the attendant is detected. Accordingly, the parallel enable input to distant slot counter 1514 is also low, thus locking the time slot number of the interface station therein. It should thus be apparent that the *j* output of comparator 1515 is high during the time slot corresponding to the interface station. This *j* output is used, in the apparatus of FIG. 15*b*, in conjunction with the high output of AND gate 1552, to provide a high output from AND gate 1553, which, in turn, is passed through OR gate 1554 to one input terminal of AND gate 729. As mentioned previsouly, the other input terminal of AND gate 729 is high in the B$\bar{I}$ supervisory state, so that a $\phi_T$ output of OR gate 729 is advantageously generated in the proper time slot for the attendant station to assume the identity of the interface station, consistent with step 2 of the call transfer process.

The attendant station now monitors the time slot associated with the desired party for an idle (LOD) condition. When detected, as in a normal call procedure previously described, the attendant's supervisory circuitry advances to the C$\bar{I}$ state, and the $\phi_T$ and the $\phi_R$ signals are reversed, also as described previously using the changed input and output states of inverter 712. Transmission is then inserted in the time slot associated with the desired party while received signals are extracted from the time slot of the interface station.

The next function performed by the apparatus of FIG. 15*a*, still part of step 3 of the call transfer process, is the transmission, to the desired party, of an identification code identifying the interface station set's TDM time slot number. The procedure followed is the same as that used in conjunction with the circuitry of FIG. 9. However, in lieu of comparator 910 of that Figure, there is provided comparator 1516 of FIG. 15*a*, which includes a selectable three word capacity under the control of select inputs *a, b* or *c*. In the $\overline{CI}$ supervisory state, and in the CT (call transfer) mode, all of the inputs to AND gate 1517 are high. Accordingly, word *b* of comparator 1516 is selected, and a code indicating the slot number of the interface station set is transmitted to the desired party, in the normal manner. When transmission of the identifcation sequence is completed, the end identification (EI) output of comparator 1516 results in the transmission of a zero bit, which in turn results in the advancing of the attendant's station supervisory logic to the D state.

After the desired party has answered, the attendant may monitor the call to assure that the call has been properly routed. If so, the attendant may complete the call transfer sequence by again depressing the transfer button on dial pad 1501. This is detected by transfer decoder 1502, the output of which acts to reset toggel flip-flop 1503 to the $\overline{CT}$ State. At this point, the output and AND gate 1552 goes low, causing the generation of $\phi_T$ and $\phi_R$ timing signals in the time slots associated with the interface station set and the attendant station set, respectively. Also, in this condition, both inputs to AND gate 1518 are high, so that the high output of the latter is applied to one input terminal of AND gate 1520, via OR gate 1519. The second input of AND gate 1520 is also high, in the supervisory D state, so that word *c* of compartor 1516 is selected. Thus, the dial memory output, which still contains the desired party's slot number is encoded as part of an identification sequence and transmitted to the interface station set (thus completing step 4 of the call transfer process) where it is stored as a distant slot number. The interface set, which is still in the BI supervisory state, after detecting the transmitted slot number, advances to the CI state, and then immediately to the D state, since it is already in an off-hook condition. Bidirectional communication may now proceed between the interface station set and the desired party since, it will be remembered, the latter has stored in its distant slot counter the slot number corresponding to the interface station set.

Having now performed its function, the attendant station is now returned to a normal state when the attendant releases the transfer button, since this causes the output of transfer decoder 1502 to go low, which, in turn, produces a high output from AND gate 1521 and OR gate 1504 and a reset command to flip-flop 1505. Also, since no data is now present in the time slot of the attendant station, the LOD condition thus produced causes its supervisory logic to reset to the A state.

It is to be noted that the circuitry of FIGS. 15*a* and 15*b* operates in the same manner as the apparatus of FIGS. 7*a* and 9, when not involved in a call transfer sequence. For example, dial memory 1507 is transparent in the $\overline{CTA}$ mode, since its parallel enable (PE) input is then high. When in the $\overline{CT}$ mode, either word *a* or word *c* is selected in comparator 1516. Word *a* corresponds to the station slot number of FIG. 9, while word *c* corresponds to the dial pad output of that Figure. AND gate 1522 assures the necessary logical conditions in the former case, while AND gate 1520 provides the same function in the latter case. Comparators 1523 and 1525 are the same as comparators 700 and 720, respectively, of FIG. 7*a* and provide the $\phi_T$ and $\phi_R$ timing signals in the appropriate time slots, when the output of AND gate 1552 is low. AND gates 1555, 1556, and inverter 1557 of FIG. 15*b* are used in this process.

AND gate 1558 and OR gate 1559 of FIG. 15*b* are used to insert a string of consective positive level pulses in the time slot of the attendant station set during the call transfer sequence. This string is provided at each occurrence of the *k* output of comparator 1523, when the output of AND gate 1552 is also high, and serves to indicate that the attendant station is busy.

If at any time during a call transfer, the attendant wishes to abandon the sequence because the desired party is busy or does not answer, a release button located on his station set is depressed. The output of OR gates 1524 and 1504 then go high, resetting toggle flip-flop 1503 to the $\overline{CT}$ State, and flip-flop 1505 to the $\overline{CTA}$ state. Also, referring to FIG. 6, the supervisory logic is preset to the $\overline{CI}$ state. The output of AND gate 1522 is then high, selecting word *a* of compartor 1516 for trasnsmission to the interface station set. When transmission is completed, the attendant's slot number is restored in the interface station set, and vice-versa. Thus, the conditions of both sets are the same as they were before the call transfer was initiated.

3. Master Terminal

Figure 16:
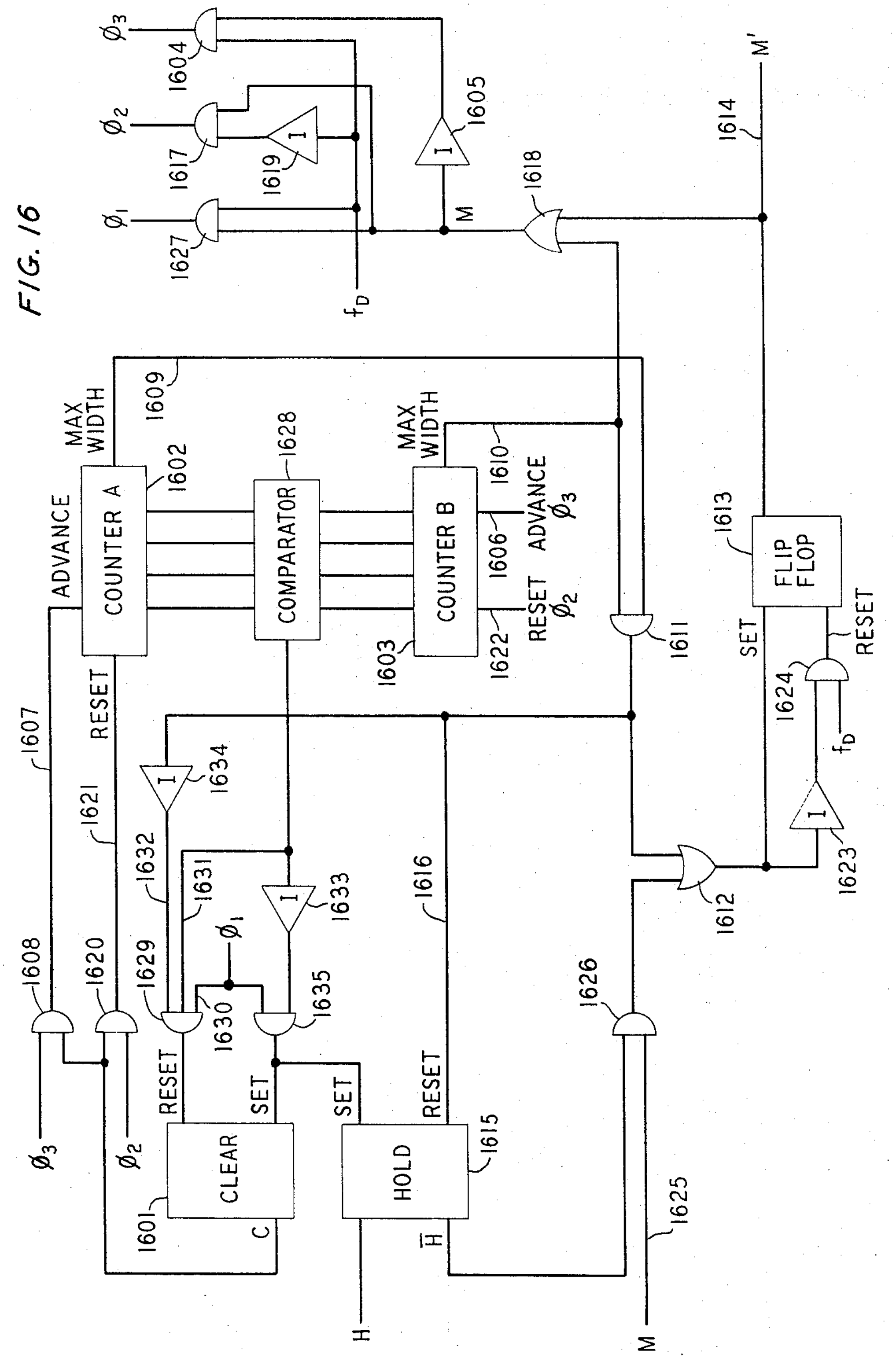
FIG. 16 is a block diagram of the mark monitor circuitry which may be used in the master station set of FIG. 1.

Conceptually, master terminal 107 of FIG. 1 need only contain a repeater, such as tristable repeater 301 of FIG. 3, and a circuit which is arranged to generate a single mark pulse when system power is turned on. However, error pulses inherent in any practical system might erase the mark pulse, or generate an erroneous pulse, resulting in interruption of system operation. To account for this possiblity, means within the master terminal may be provided to automatically detect an erroneous mark sequence, and reset the system. A block diagram of a mark monitor circuit in accordance with the invention is shown in FIG. 16.

The operation of the circuit of FIG. 16 can be explained as follows: Initially assuming that clear flip-flop 1601 is in the set condition, and counters 1602 and 1603 are at the same arbitrary count, $\phi_3$ clock pulses are produced by AND gate 1604 at the data rate $f_d$, since the output of inverter 1605 is high. These $\phi_3$ pulses are used to advance counter 1603 on line 1606, and to simultaneously advance counter 1602 on line 1607 via the output of AND gate 1608, both of whose inputs are high. Counters 1602 and 1603 are advantageously arranged to produce high outputs on lines 1609 and 1610, respectively, upon reaching a predetermined maximum count which is greater than the total number *n* of station sets on the loop. Accordingly, when both counters have attained a maximum count, both inputs to AND gate 1611 are high, and its output, fed through OR gate 1612, is used to provide a set signal to flip-flop 1613. The output of the latter generates the leading edge of the first mark pulse on output line 1614. The high output of AND gate 1611 also serves to reset hold flip-flop 1615 via an input on line 1616.

To understand the formation of the trailing edge of the first mark pulse, it should first be noted that $f_d$ clock pulses are advantageously configured as a square wave, consequently having equal high and low intervals of length $1/2f_d$. Accordingly, after the output on line 1614 has gone high, one input to AND gate 1617 will also be high (via OR gate 1618), so that when $f_d$ goes low, the inverted output of inverter 1619 will produce a $\phi_2$ output from AND gate 1617. The latter signal, in conjunction with the high output of clear flip-flop 1601, produces a high output from AND gate 1620 on line 1621, causing counter 1602 to reset. Simultaneosuly, counter 1603 is reset by the $\phi_2$ signal applied to it on line 1622. This resetting action cuases the output of AND gate 1611 to go low, which, in turn, produces a low output from OR gate 1612. This low output, inverted in inverter 1623, is applied to one input terminal of AND gate 1624, so that when $f_d$ again goes high at the beginning of the next frame period, the high output thereof is used to reset flip-flop 1613, thus forming the trailing edge of the first mark pulse on line 1614.

As the first mark pulse proceeds around the loop, $\phi_3$ signals are again used to simultaneously advance both counters 1602 and 1603. When the first mark pulse returns on input line 1625, both inputs to AND gate 1626 are high, again causing flip-flop 1613 to set (via OR gate 1612) and produce a second mark pulse on output line 1614, as previsously described. During the presence of this second pulse, the output of OR gate 1618 is high, so that during the portion of the TDM time slot when the $f_d$ timing pulse is also high, a $\phi_1$ output is generated by AND gate 1627. Simultaneously, the output of comparator 1628, which is arranged to compare the outputs of counters 1602 and 1603, is also high, since the counters were reset and advanced in unison. Accordingly, the inputs to AND gate 1629 on lines 1630 and 1631 are both high. Additionally, the third input to AND gate 1629 on line 1632 is high, due to the low output from AND gate 1611 which is inverted by inverter 1634, thereby producing a high output of AND gate 1629 and thus a reset pulse to clear flip-flop 1601. As a result of this reset action, one input terminal of each of AND gates 1608 and 1620 is held low, inhibiting counter 1602 from further advancing and from being reset, and locking therein a count equivalent to the number of $f_d$ clock periods required to advance a mark pulse around the loop.

As the second each subsequent mark pulse proceeds around the loop, counter 1603 alone will count $\phi_3$ pulses generated by AND gate 1604. If the mark pulse reappears at the proper time, the output of comparator 1628 will again so high, repeating the foregoing process.

If, due to loop disturbances or other transmission anomalies, a mark pulse were erased or misplaced, the counts in counters 1602 and 1603 would disagree, causing the output of comparator 1628 to go low when $\phi_1$ is generated. If an erroneous mark pulse were generated, its detection at AND gate 1626, resulting in a mark generation on line 1614, would yield the $\phi_1$ signal, as previously described. If the mark pulse were lost, counter 1603 would proceed to its maximum count, producing a high output on line 1610 and consequently generating a $\phi_1$ pulse via OR gate 1618 and AND gate 1627. In either case, this $\phi_1$ pulse, in conjunction with the high output of inverter 1533 produces a high output from AND gate 1635, which sets both clear and hold flip-flops 1601 and 1615, respectively. As a result, AND gate 1626 is disabled and the path between input line 1625 and output line 1614 broken. The set output of clear flip-flop 1601 again enables one input terminal of AND gates 1608 and 1620, allowing counter 1602 to be advanced and reset in the presence of $\phi_3$ and $\phi_2$ pulses, respectively. Counters 1602 and 1603, the latter also being reset by a $\phi_2$ pulse. are then advanced in unison until both reach the maximum count. The procedure described above is then repeated.

4. System Modification for $m > 1$

Changes to the basic system configuration to accommodate the case where it is desired to have $m > 1$ are relatively easy to make and yet retain the advantages heretofore described. Basically, the modification is accomplished by substituting, for each of master slave flip-flops 407 and 402 of FIG. 4, an $m$ bit serial-in, serial-out shift register, the details of which will be well known to those skilled in the art. Additionally, to provide proper control of the $\phi_T$ and $\phi_R$ timing pulses generated by the apparatus of FIG. 7*a*, a divide by $m$ circuit should be provided on the advance input line of time slot counter 709. By so doing, $\phi_R$ is now high for $m$ time slots, thereby allowing the serial extraction of $m$ bits from the bit stream. Similarly, $\phi_T$ is high for the same duration, allowing an $m$ bit sequence to be inserted on the loop.

The necessity for other system changes, in the case where $m>1$, would depend upon the signalling sequences used within the supervisory logic provided in each station set, and serves other factors. As an example, it may, in certain situations, be desirable to replace the DATA and $\overline{\text{DATA}}$ inputs with a unique $m$ bit code and an $m$ bit string of consecutive zeroes, respectively, and arranged for the generation of a U signal (see FIG. 7*b*) only in the presence of two of the above-mentioned code sequences, in succession, The particular code selected will, of course, be determined by the probability of its occurrence in normal speech or data signals. Additionally, for certain values of $m$, it may prove advantageous to utilize PCM apparatus in lieu of the delta modulation codec of FIG. 10.

5. Alternate System Configurations

Figure 17A:
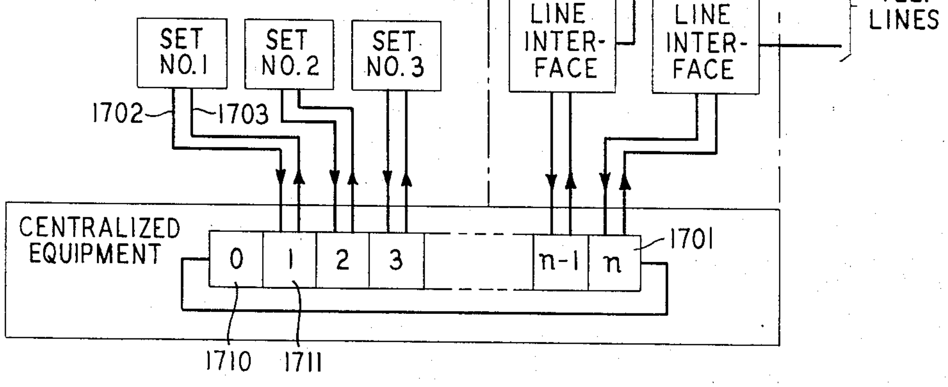
FIGS. 17*a* and 17*b* are block diagrams of various alternate configurations which may be used in accordance with the invention, in interconnecting the station sets of FIG. 1.

The configuration of the system of FIG. 1 can be modified in various ways to meet the physical space requirements of a particular user. For example, as shown in FIG. 17*a*, the repeater portion 1710, 1711, etc., of each station set, interface station set, and the master station can be centrally located, in the form of closed loop shift register 1701. In this configuration, system power must be supplied to the centralized equipment and stations but need not be transmitted through the stations. Also, reliability is increased, because a cable failure or defect in the lines, such as lines 1702, 1703, connecting a station set to the centralized equipment affects only that station.

Figure 17B:
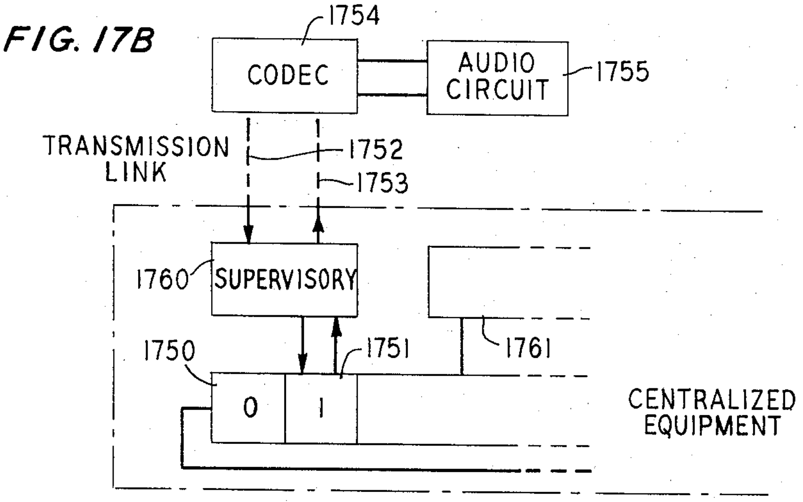

Another possible configuration is illustrated in FIG. 17*b*, wherein the centralized equipment includes both the station repeaters 1750, 1751, etc., and the associated supervisory logic 1760, 1761. In this event, the transmitted bit rate on lines such as lines 1752, 1753 is reduced to the sampling rate of codec 1754. However, means must be provided to transmit dialed information from the customer apparatus to supervisory logic 1760. If desired, even codec 1754 can be included in the centralized equipment. In this event, conventional station equipment could be used, but would require, in addition to audio circuit 1755, a ring generator, multifrequency receiver, and other supervision equipment.

It is to be understood that the various embodiments described herein are merely illustrative of the principles of the invention, and that various modifications thereto may be effected by persons skilled in the art without departing from the spirit and scope of the invention. For example, it is to be understood that the tri-level nature of the pulse train described hereinabove is merely illustrative of one means for recovering frame synchronization. If desired, a two level scheme could be utilized, wherein every $X^{th}$ bit is forced to be positive, and a departure from this rule is detected as a framing indication. In this event, certain system modifications will be required, as will be apparent to those skilled in the art.

What is claimed is:

1. A time division multiplex communication system for providing bidirectional communcation between any one of a plurality of *n* station sets and any other one of said station sets, comprising:

a closed transmission loop serially interconnecting said station sets, means for establishing a plurality *n* of time division multiplex channels of width *t* circulating unidirectionally on said loop, each of said station sets including:

1. means for associating each of said station sets with any desired one of said channels, for receiving purposes,
2. means for inserting, *m* bits at a time, data in the one of said channels associated with a remote one of said station sets,
3. means for extracting, *m* bits at a time, data in the one of said channels associated therewith, and
4. means for storing and repeating, *m* bits at a time, data in the remaining ones of said channels, thereby facilitating variations in the number *n* of station sets on said loop independently of other changes in said system.

2. The invention defined in claim 1 wherein said station sets further include:

input means for generating a first analog signal in response to an audio input signal, encoder means for converting said first analog signal to said data to be inserted, decoder means for converting said extracted data to a second analog signal, and output means for receiving said second analog signal and for generating an audio output in response thereto.

3. The invention defined in claim 2 wherein at least one of said station sets includes means for deriving said audio input signal from an outside telephone line.

4. The invention defined in claim 3 wherein said channel establishing means includes:

means in one of said station sets for initially generating a framing indication of width *t* and for subsequently generating framing indications in response to the receipt of the previous framing indication, and means in the remaining ones of said station sets for receiving said framing indications, storing said framing indications for a period *t*, and for regenerating said framing indications.

5. The invention defined in claim 4 wherein said data storing means includes an *m* bit, serial-in, serial-out shift register.

6. The invention defined in claim 1 wherein each of said station sets further includes:

means operative in conjunction with said extracting means for monitoring the one of said channels associated with a remote one of said station sets for the existence of an idle condition, and means operative in conjunction with said inserting menas for generating simultaneously with the operation of said last-named means a code indicating to remaining ones of said station sets the busy status of said each station set, and for subsequently generating a code indicating to said remote station set the one of said channels associated with said each station set.

7. A time division multiplex communication system comprising:

a plurality of station sets each including:

repeater circuits serially interconnected on a closed unidirectional transmission loop, said repeaters including means for receiving a digital pulse train containing data signals and timing signals circulating on said loop, for storing said pulse train, *m* bits at a time, and for retransmitting said pulse train on said loop, means for separating said data signals from said timing signals in said pulse train, and supervisory logic means responsive to said separating means for processing portions of data in said pulse train selected in accordance with their relationship to said timing signals, said logic means including:

a. means for inserting data originating in a first one of said station sets, *m* bits at a time, in the portion of said pulse train associated with a second one of said station sets, and b. means for extracting data originating in said second station set, *m* bits at a time, from the portion of said pulse train associated with said first station set.

8. A system in accordance with claim 7 wherein said supervisory logic means further include:

means in said first station set for generating a coded data signal indicative of said portion of said pulse train associated with said first station set, and means in said second station set for receiving said coded data signal and for identifying siad portion of said pulse train associated with said first station set.

9. A time division multiplex communication system including:

1. a closed unidirectional transmission loop adapted to transmit a stream of pulses,
2. a plurality of terminals serially interconnected on the loop,
3. the terminals including $n-1$ station sets and a master set,
4. the master set including means for transmitting a framing indication of duration *t* on said loop in response to the reception of the preceding framing indication,
5. means within each of the station sets for storing for a duration *t* and regenerating the framing indication,
6. means within each station set for associating with each of said station sets a particular time interval of said duration *t* following the framing indication, 7. means within each station set for inserting $m$ bits of data generated in the station set in the time interval associated with a distant station set,
8. means within each station set for extracting $m$ bits of data from the time interval associated therewith, and,
9. means within each station set for storing and regenerating data, $m$ bits at a time, during each of the remaining time intervals, whereby the $n \times m$ bits on the loop at any time are stored within the station sets.

10. The invention defined in claim 9 wherein $m = 1$.

11. The invention defined in claim 9 wherein said storage and regeneration means within each of said station sets comprises a tristable repeater circuit.

12. The invention defined in claim 11 wherein at least one of said station sets further includes means for connecting said set to an outside telephone line.

13. The invention defined in claim 11 wherein said master station set includes:

first means for initially generating a framing indication on said loop, second means for detecting an erroneous sequence of framing indications, and third means responseive to said second means for resetting said first means.

14. The invention defined in claim 13 wherein said tristable repeater circuit comprises:

means for separating said framing indications from the remainder of said pulse stream, and means for extracting timing information from said framing indications.

15. The invention defined in claim 14 wherein said extracting means includes a crystal clock phase-locked to said framing indications on an asynchronous frame-to-frame basis.

16. The invention defined in claim 14 wherein said associating means includes counter means arranged to be reset by said framing indications and to respond to said timing information, means for storing the number of the time interval associated with a particular one of said station sets, and means jointly responsive to said storage means and said counter means for outpulsing during said associated time interval.

17. A time division multiplex communication system comprising:

a closed unidirectional transmission loop adapted to transmit a digital bit stream, a master station set connected to said loop and arranged to initially generate a mark pulse of width $t$ on said loop and to generate a series of succeeding mark pulses in response to the reception of each preceding one of said mark pulses, a plurality of $n$ station sets serially interconnected on said loop and arranged to receive and extract said mark pulses from said bit stream, store said mark pulses for a period $t$, and regenerate and reinsert said mark pulses in said bit stream, thereby defining a frame interval between adjacent mark pulses of length $(n-1)t$ comprised of $n-1$ TDM time slots each of width $t$, means within each station set for 1. associating said station set with a particular one of said TDM time slots, for receiving purposes,
2. providing an encoded digital signal representative of an analog input signal,
3. inserting said encoded signal, $m$ bits at a time in said time slot associated with a distant station set,
4. extracting a corresponding encoded signal, $m$ bits at a time, from said time slot associated therewith,
5. providing a decoded analog signal representative of said corresponding encoded signal, and
6. storing and regenerating digital signals, $m$ bits at a time, in remaining ones of said TDM time slots.

18. A time division multiplex communication system comprising:

a plurality of $n-1$ station sets, a master station set, a closed loop unidirectional transmission link serially interconnecting said station sets and said master set and adapted to transmit a stream of digital bits, first means in said master station for initially generating a mark pulse, second means in said station sets for receiving said mark pulse, delaying said mark pulse for a time interval $t$, and retransmitting said mark pulse on said loop, third means in said master station for regenerating said mark pulse in response to the reception of the preceding mark pulse, thereby defining a frame length $n-t$ between successive mark pulses comprised of $n$ equal time slots of length $t$, fourth means in said station sets for associating each of said sets with a particular one of said time slots, fifth means in said station sets for inserting, $m$ bits at a time, data generated in said station set in said time slot associated with a remote station set, sixth means in said station sets for extracting $m$ bits at a time, data contained in said time slot associated therewith, and seventh means in said station sets for storing and regenerating, $m$ bits at a time, data in remaining ones of said time slots.

19. The invention defined in claim 18 wherein at least one of said station sets includes eight means for connecting said set to an outside telephone line.

20. The invention defined in claim 19 wherein said master station set further includes ninth means for detecting an erroneous sequence of said mark pulses and tenth means responsive to said ninth means for reestablishing a proper mark pulse sequence on said loop.

* * * * *

UNITED STATES PATENT OFFICE
CERTIFICATE OF CORRECTION

Patent No. 3,781,478 Dated December 25, 1973

Inventor(s) Donald E. Blahut, Fritz E. Froehlich

It is certified that error appears in the above-identified patent and that said Letters Patent are hereby corrected as shown below:

| | | |
|---|---|---|
| Column 2, | line 20, | "operaion" should read --operation--. |
| 5, | 63, | "whre" should read --where--. |
| 8, | 21, | "610" should read --601--. |
| 8, | 32, | "termina" should read --terminals--. |
| 12, | 8, | "901" should read --910--. |
| 12, | 11, | "one" should read --on--. |
| 12, | 53, | "numbered" should read --number--. |
| 13, | 48, | "incorporates" should read --incorporate--. |
| 14, | 59, | "$\alpha_R$" should read --$\emptyset_R$--. |
| 15, | 55, | "hsa" should read --has--. |
| 16, | 23, | "This" should read --The--. |
| 16, | 35, | "signa" should read --signal--. |
| 16, | 40, | "si" should read --is--. |
| 16, | 52, | "from" should read --form--. |
| 16, | 54, | "oxcillator" should read --oscillator--. |
| 17, | 44, | "nromal" should read --normal--. |
| 18, | 20, | "738" should read --728--. |
| 19, | 24, | "toggel" should read --toggle--. |
| 19, | 25, | "State" should read --state--. |
| 19, | 26, | delete "and" before "AND" and substitute --of--. |
| 20, | 3, | "1525" should read --1515--. |

Certificate of Correction - 2

Patent No. 3,781,478

D. E. Blahut, F. E. Froehlich

Column 20, line 21, "State" should read --state--.
21, 10, "cuases" should read --causes--.
21, 44, after "Second" add --and--.
21, 48, "so" should read --go--.
21, 48, before "repeating" insert --thus--.
21, 62, "1533" should read --1633--.
24, 8, "menas" should read --means--.
24, 47, "siad" should read --said--.
25, 24, "responseive" should read --responsive--.
26, 50, "eight" should read --eighth--.

Signed and sealed this 30th day of April 1974.

(SEAL)
Attest:

EDWARD M.FLETCHER,JR.
Attesting Officer

C. MARSHALL DANN
Commissioner of Patents